United States Patent
Reh et al.

(10) Patent No.: US 10,949,455 B2
(45) Date of Patent: Mar. 16, 2021

(54) AUTOMATED PROCESS COLLABORATION PLATFORM IN DOMAINS

(71) Applicant: Live Objects, Inc., Palo Alto, CA (US)

(72) Inventors: Michael Reh, Schriesheim (DE); Sudipto Shankar Dasgupta, Sunnyvale, CA (US)

(73) Assignee: Live Objects, Inc., Palo Alto, CA (US)

( * ) Notice: Subject to any disclaimer, the term of this patent is extended or adjusted under 35 U.S.C. 154(b) by 0 days.

(21) Appl. No.: 16/886,523

(22) Filed: May 28, 2020

(65) Prior Publication Data

US 2020/0293564 A1    Sep. 17, 2020

Related U.S. Application Data

(63) Continuation-in-part of application No. PCT/US2020/016838, filed on Feb. 5, 2020, which is (Continued)

(30) Foreign Application Priority Data

Feb. 12, 2019   (IN) ............................ 201941005513

(51) Int. Cl.
*G06F 16/35*     (2019.01)
*G06N 5/02*      (2006.01)
(Continued)

(52) U.S. Cl.
CPC .......... *G06F 16/353* (2019.01); *G06F 16/316* (2019.01); *G06N 3/0427* (2013.01);
(Continued)

(58) Field of Classification Search
None
See application file for complete search history.

(56) References Cited

U.S. PATENT DOCUMENTS 5,182,794 A    1/1993   Gasperi et al.
5,890,133 A    3/1999   Ernst
(Continued)

OTHER PUBLICATIONS

Agrawal, R. et al., "Mining Process Models from Workflow Logs," International Conference on Extending Database Technology, Jan. 22, 1998, pp. 1-21.
(Continued)

*Primary Examiner* — Alan Chen
(74) *Attorney, Agent, or Firm* — Fenwick & West LLP

(57) ABSTRACT

A computing server may receive master data, transaction data, and a process model of a domain. The computing server may aggregate, based on domain knowledge ontology of the domain, the master data and the transaction data to generate a fact table. For example, entries in the fact table may be identified as relevant to the target process model and include attributes and facts that are extracted from master data or transaction data. The computing server may convert the entries in the fact table into vectors. The computing server may identify, based on the vectors, an attribute in the process model as being statistically significant on impacting the process model. For example, a regression model may be used to determine the statistical significance of an attribute on the model process. The computing server may generate an action associated with the attribute to improve the process model.

19 Claims, 11 Drawing Sheets

Related U.S. Application Data a continuation of application No. 16/540,530, filed on Aug. 14, 2019, now Pat. No. 10,592,544.

(60) Provisional application No. 63/006,615, filed on Apr. 7, 2020.

(51) Int. Cl.
    *G06N 3/04*      (2006.01)
    *G06F 16/31*     (2019.01)
    *G06N 3/08*      (2006.01)

(52) U.S. Cl.
    CPC ......... *G06N 3/0445* (2013.01); *G06N 3/0454* (2013.01); *G06N 3/08* (2013.01); *G06N 5/025* (2013.01)

(56) References Cited

U.S. PATENT DOCUMENTS

| | | | |
|---|---|---|---|
| 6,763,353 | B2 | 7/2004 | Li et al. |
| 7,120,896 | B2 | 10/2006 | Budhiraja et al. |
| 7,162,458 | B1 | 1/2007 | Flanagan et al. |
| 7,480,640 | B1 | 1/2009 | Elad et al. |
| 8,036,907 | B2 | 10/2011 | Davies et al. |
| 8,166,013 | B2 | 4/2012 | Bandaru et al. |
| 8,631,048 | B1 | 1/2014 | Davis et al. |
| 9,176,951 | B2 | 11/2015 | Patrudu |
| 9,672,497 | B1 * | 6/2017 | Lewis ............... G06F 40/40 |
| 10,157,347 | B1 * | 12/2018 | Kasturi ............. G06F 16/3322 |
| 10,176,245 | B2 * | 1/2019 | Lim ................. G06F 16/285 |
| 10,311,442 | B1 * | 6/2019 | Lancaster .......... G06N 5/003 |
| 10,607,042 | B1 | 3/2020 | Dasgupta et al. |
| 10,851,636 | B1 | 12/2020 | Basu et al. |
| 10,877,979 | B2 | 12/2020 | Costabello et al. |
| 2004/0210552 | A1 | 10/2004 | Friedman et al. |
| 2009/0281845 | A1 | 11/2009 | Fukuda et al. |
| 2011/0161333 | A1 | 6/2011 | Langseth et al. |
| 2013/0096947 | A1 * | 4/2013 | Shah ............... G16H 20/10 705/3 |
| 2013/0311446 | A1 | 11/2013 | Clifford et al. |
| 2015/0058337 | A1 | 2/2015 | Gordon et al. |
| 2015/0106078 | A1 * | 4/2015 | Chang .............. G06F 16/35 704/9 |
| 2015/0296395 | A1 | 10/2015 | Vaderna et al. |
| 2016/0140236 | A1 | 5/2016 | Estes |
| 2016/0247087 | A1 | 8/2016 | Nassar et al. |
| 2016/0253364 | A1 | 9/2016 | Gomadam et al. |
| 2017/0109657 | A1 | 4/2017 | Marcu et al. |
| 2018/0032861 | A1 | 2/2018 | Oliner et al. |
| 2018/0137424 | A1 * | 5/2018 | Gabaldon Royval .. G06N 5/022 |
| 2018/0146000 | A1 | 5/2018 | Muddu et al. |
| 2018/0219889 | A1 | 8/2018 | Oliner et al. |
| 2018/0232443 | A1 | 8/2018 | Delgo et al. |
| 2018/0253653 | A1 | 9/2018 | Ozcan et al. |
| 2018/0322283 | A1 | 11/2018 | Puri et al. |
| 2019/0018904 | A1 | 1/2019 | Russell et al. |
| 2019/0102430 | A1 | 4/2019 | Wang et al. |
| 2019/0303441 | A1 | 10/2019 | Bacarella et al. |
| 2020/0097545 | A1 | 3/2020 | Chatterjee et al. |

OTHER PUBLICATIONS

Bhaskaran, S. K. et al., "Neural networks and conditional random fields based approach for effective question processing," Procedia Computer Science, 2018, pp. 211-218, vol. 143.

Bowman, J. S. et al., "The Practical SQL Handbook: Using Structured Query Language,". Addison-Wesley Longman Publishing Co., Inc., Oct. 1996, four pages (with cover page and table of contents).

Chen, D. et al., "A Fast and Accurate Dependency Parser using Neural Networks," Proceedings of the 2014 Conference on Empirical Methods in Natural Language Processing (EMNLP), Oct. 25-29, 2014, pp. 740-750, Doha, Qatar.

Dijkman, R. M. et al., "Semantics and analysis of business process models in BPMN," Information and Software Technology, 2008, pp. 1281-1294, vol. 50.

Ertam, F. et al., "Data Classification with Deep Learning using Tensorflow," International Conference on Computer Science and Engineering (UBMK), IEEE, 2017, pp. 755-758.

Explosion AI, "Architecture: Library architecture," undated, three pages, May be Retrieved at<URL:https://spacy.io/api/>.

Hochreiter, S. et al., "Long Short-Term Memory," Neural Computation, Nov. 15, 1997, pp. 1735-1780, vol. 9, No. 8.

Hua, Y. et al., "Deep Learning, with Long Short-Tenm Memory for Time Series Prediction," arXiv preprint arXiv:1810.10161, Oct. 24, 2018, nine pages, No. 1.

Jie, Z. et al., "Efficient Dependency-Guided Named Entity Recognition," arXiv preprint arXiv:1810.08436, Oct. 22, 2018, 18 pages, No. 2.

Juszczak, P. et al., "Feature scaling in support vector data description," Proc. asci. Citeseer, 2002, pp. 95-102.

Kiperwasser, E. et al., "Simple and Accurate Dependency Parsing Using Bidirectional LSTM Feature Representations," Transactions of the Association for Computational Linguistics, Jul. 2016. pp. 313-327, vol. 4.

Lafferty, J. et al., "Conditional Random Fields: Probabilistic Models for Segmenting and Labeling Sequence Data," Proceedings of the 18$^{th}$ International Conference on Machine Learning, Jun. 28, 2001, pp. 282-289.

Lipton, Z. et al., "A Critical Review of Recurrent Neural Networks for Sequence Learning," arXiv preprint arXiv:1506.00019, Jun. 5, 2015, 38 pages.

Miller, E. "An Introduction to the Resource Description Framework." Bulletin of the American Society for Information Science, Oct./Nov. 1998, pp. 15-19.

Pennington, J. et al., "Glove: Global Vectors for Word Representation," Proceedings of the 2014 Conference on Empirical Methods in Natural Language Processing (EMNLP), Oct. 25-29, 2014, pp. 1532-1543, Doha, Qatar.

PCT International Search Report and Written Opinion, PCT Application No. PCT/US2020/016838, dated Jun. 4, 2020, 28 pages.

PCT International Search Report and Written Opinion, PCT Application No. PCT/US2020/016834, dated Apr. 30, 2020, 18 pages.

Rubin, V., et al., "Process Mining Framework for Software Processes." International Conference on Software Process, May 2007, 21 pages.

Rubin, V., et al., "Process Mining Framework for Software Processes," undated, 12 pages, May be Retrieved at<URL:http://www.processmining.org/_media/publications/wvdaalst_p401.pdf>.

Seber, G. et al., "Linear Regression Analysis," John Wiley & Sons, 2003, 13 pages (with cover page and table of contents).

Steinbach, M. et al., "A Comparison of Document Clustering Techniques," KDD Workshop on Text Mining, Aug. 20-23, 2000, 20 pages.

TensorFlow, "Why TensorFlow," undated, five pages, [Online], Retrieved from the Internet, <URL:https://www.tensorflow.org/about>.

Van Der Aalst, W. et al., "ProM: The Process Mining Toolkit," Proceedings of the Business Process Management Demonstration Track (BPMDemos 2009). Sep. 8, 2009, 49 pages, Ulm, Germany.

Von Rosing, M. et al., "Business Process Model and Notation-BPMN," 2015, pp. 429-453.

Wang, P. et al., "Semantic expansion using word embedding clustering and convolutional neural network for improving short text classification," Neurocomputing, 2016, pp. 806-814, vol. 174.

Zeileis, A. et al., "Diagnostic Checking in Regression Relationships," R News, Dec. 2002, five pages, vol. 2/3.

Zou, K. et al., "Correlation and Simple Linear Regression," Radiology, Jun. 2003, pp. 617-622, vol. 227, No. 3.

\* cited by examiner

AUTOMATED PROCESS COLLABORATION PLATFORM IN DOMAINS

CROSS-REFERENCE TO RELATED APPLICATION

The present application is a continuation in part of PCT Application No. PCT/US2020/016838, filed on Feb. 5, 2020, which claims priority to U.S. application Ser. No. 16/540,530, filed on Aug. 14, 2019 and now U.S. Pat. No. 10,592,544, which claims the benefit of Indian Provisional Patent Application 201941005513, filed on Feb. 12, 2019. The present application also claims the benefit of U.S. Provisional Patent Application 63/006,615, filed on Apr. 7, 2020. All of which are hereby incorporated by reference in their entirety.

TECHNICAL FIELD

The present disclosure generally relates to process optimization in a domain, and more specifically, to a platform for generating, recommending, and assigning actions for process optimization using one or more machine learning algorithms.

BACKGROUND

Various domains are often associated with their own data structure and data sources. A domain may include heterogeneous data such as unstructured data that may include text, files, and documents stored in various computers and structured data stored in one or more databases. It is challenging to process a large amount of data that could be distributed among various heterogeneous sources that are not easily identified and managed. Conventional techniques available for processing text and documents involve labor-intensive data generation techniques such as manual identification and categorization of objects and attributes in the text and documents.

The conversion of unstructured files and documents to structured data that is organized in a manner easily accessible by a domain often is too costly to perform consistently to capture all potential changes in unstructured files. For example, a domain may generate a large number of documents and files every second. Conventionally, while the existence or creation of those files may be captured by the domain, information included in the unstructured documents and files may contain important data that are not often automatically converted to a format that is easily accessible from a database. Also, even if some of the information is converted to structured data, data from various sources is often not sufficiently linked to provide meaningful insights regarding the domain. It is often difficult for a domain to keep track of the sheer amount of data generated from transactions of the domain during its normal course of operation.

Figure 1:
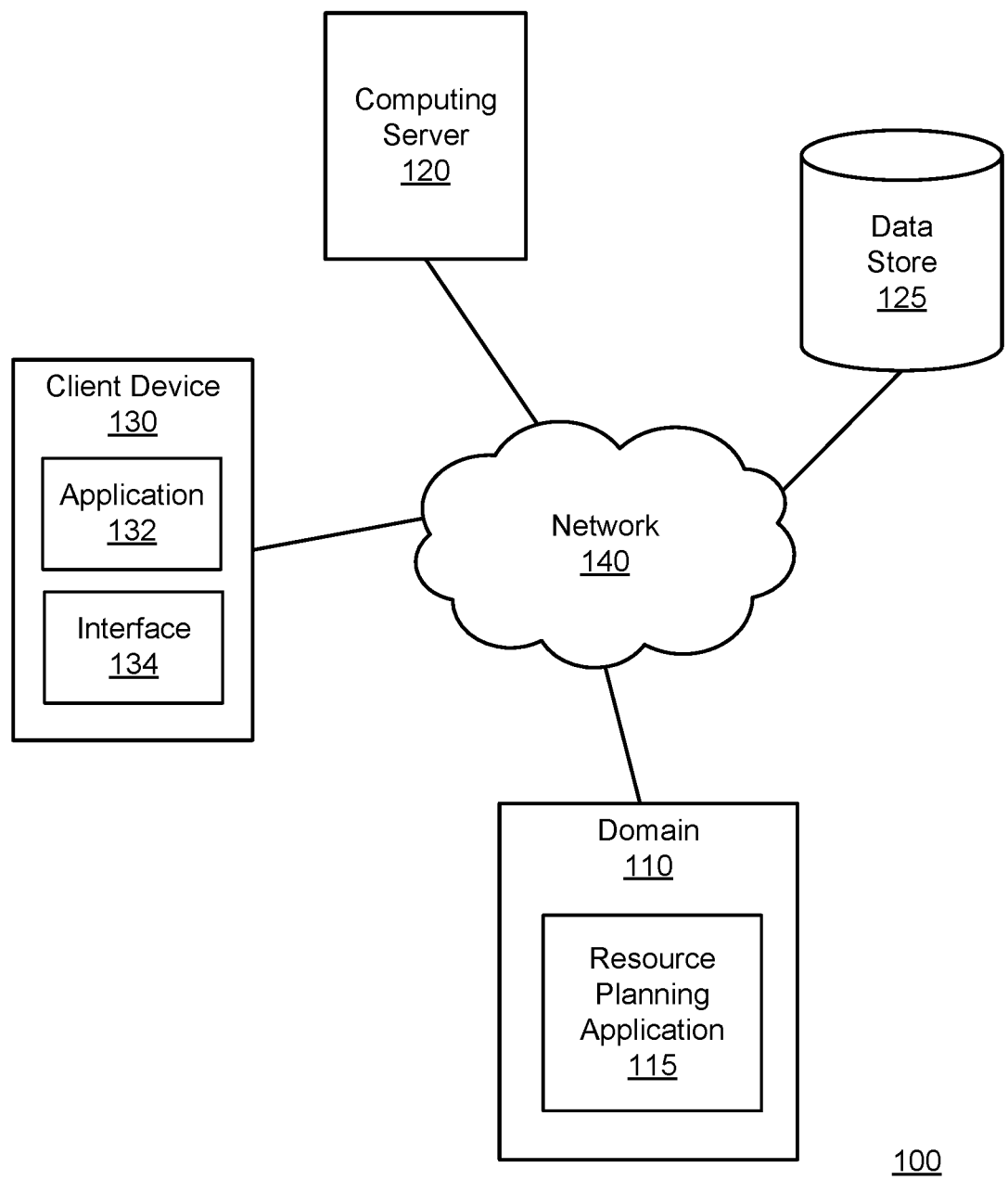
FIG. 1 is a block diagram illustrating an example system environment, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed embodiments herein relate to automatic optimization of process models of a domain and identification of recommended actions to improve the process models. A domain often generates a sheer amount of heterogeneous data related to transactions evolved around a process. A computing server may identify data of relevant transactions that may represent a process model's attributes or characteristics to be optimized. The computing server may train one or more machine learning algorithms to automatically extract relevant data related to a process model and to identify one or more steps in the process model that can be optimized. The computing server generates recommended actions that improve the process models and conducts causal analyses to determine things that are impacting the performance of the process models. The identification of recommended actions and casual analyses may be performed in a largely autonomous manner. The computing server may also provide a query platform for users to inquire about reasoning and data related to the optimization of process models. The computing server, based on the casual analyses, generate outputs to the queries to share insights on optimization with the users.

By way of example, a computing server may receive master data, transaction data, and a process model of a domain. The computing server may aggregate, based on domain knowledge ontology of the domain, the master data and the transaction data to generate a fact table. For example, entries in the fact table may be identified as relevant to the target process model and include attributes and facts that are extracted from master data or transaction data. The computing server may convert the entries in the fact table into vectors. The computing server may identify, based on the vectors, an attribute in the process model as being statistically significant on impacting the process model. For example, a regression model may be used to determine the statistical significance of an attribute on the model process. The computing server may generate a recommended action associated with the attribute to improve the process model. The computing server may provide the recommended action to a user associated with the domain.

Example System Environment

Referring now to FIG. 1, shown is a block diagram illustrating an embodiment of an example system environment 100 for performing a process optimization and providing recommendation, in accordance with an embodiment. By way of example, the system environment 100 includes a domain 110, a computing server 120, a data store 125, and a user device 130. The entities and components in the system environment 100 may communicate with each other through the network 140. In various embodiments, the system environment 100 may include fewer or additional components. The system environment 100 also may include different components. Also, while each of the components in the system environment 100 is described in a singular form, the system environment 100 may include one or more of each of the components. For example, there may be multiple user devices 130 that are operated by various users of the domain 110.

A domain 110 may be a computing environment in which a system operates and/or an environment for a group of units and individuals. The domain 110 uses data from common domain knowledge to organize activities, information and entities related to the domain 110 in a specific way. An example of a domain 110 may be an organization, such as a business, an institute, or a subpart thereof and the data within it. A domain 110 may be associated with a specific domain knowledge ontology, which could include representations, naming, definitions of categories, properties, logics, and relationships among various concepts, data, transactions, and entities that are related to the domain 110. For example, a first domain may be a first organization that has its own definitions of terms and criteria on how a specific task is considered completed, while a second domain, which could be a different organization, may have different sets of definitions of terms and different sets of tasks and entities. Depending on embodiments, the boundary of a domain may or may not be the same as an organization. For example, in some embodiments, a domain corresponds to an organization and its data. In other embodiments, a single organization may be associated with multiple domains having data. Various divisions or departments of the organization may have their own definitions, internal procedures, tasks, and entities. In other embodiments, multiple organizations may share the same domain.

A domain 110 may include one or more resource planning applications 115. Depending on the use and functionality, a resource planning application 115 may also be referred to as an enterprise resource planning (ERP) application and a customer relationship management (CRM) application. A resource planning application 115 may also be referred to as a system of records. A resource planning application 115 may be a process management software that allows a domain 110 to integrate various functions related to technology, services, human resources, and transactions. Functions of a resource planning application 115 may include accounting, finance, purchasing, procurement, production and manufacturing, inventory management, distribution, supply chain management, services, orders from customers, corporate compliance and governance, customer services, human resources, reporting, and analytics, etc. A resource planning application 115 may collect, store, and manage data associated with various business activities. A resource planning application 115 may store the resources and named entities of the domain 110 as master data. A resource planning application 115 may also store transactions of the domain 110 as transaction data. The master data and transaction data may be structured and indexed and may be associated with a schema that describes relationship and structure among the data. A resource planning application 115 may also store the relationship and logic among various concepts, resources, entities, and transactions as domain knowledge ontology.

The computing server 120 may include one or more computing devices that perform various tasks related to the domain 110 such as extracting named entities and events occurred in the domain 110, generating process models from extracted events, optimizing the process models, and providing recommendations and courses of action to improve processes of the domain 110. The computing server 120 may retrieve various data such as master data, transaction data, domain knowledge ontology from the resource planning application 115 that maintains resource information of the domain 110. The computing server 120 performs analysis of various data and use different artificial intelligence techniques such as machine learning to optimize various processes of the domain 110. Optimization of a process in this disclosure may refer to an improvement to a process based on one or more measurable metrics or indicators such as costs, revenues, profits, time, numbers of personnel involved, customer satisfaction, compliance of rules and law, etc. Optimization in this disclosure does not only narrowly refer to improving the process to a state that is the most optimized. The terms "optimization," and "optimized" also includes an incremental improvement.

The degree of automation in a process optimization may vary depending on situations. In one case, a process model or at least part of the model may be manually built by personnel in the domain 110 using the resource planning application 115. The computing server 120 may retrieve the process model from the resource planning application 115. After a process model is optimized, the computing server 120 may feed the improved process model back to the resource planning application 115. In another case, the optimization may be further automated. The computing server 120, based on transaction data, master data, and unstructured data, may automatically generate a process model. Based on further monitoring of the activities and transactions of the domain 110, the computing server 120 may automatically improve the process model.

The implementation of the improved process model may also be carried out with various degrees of automation. For example, the computing server 120 may provide recommendations to personnel in the domain 110 to carry out tasks that streamline the process. In another case, the computing server 120 may automatically update the workflow of the process so that the improvement may be automatically implemented. In one embodiment, the computing server 120 allows self-optimized closed-loop process optimization. Personnel in the domain 110 may monitor the optimization and provide inputs, corrections, and labels if needed.

Figure 10:
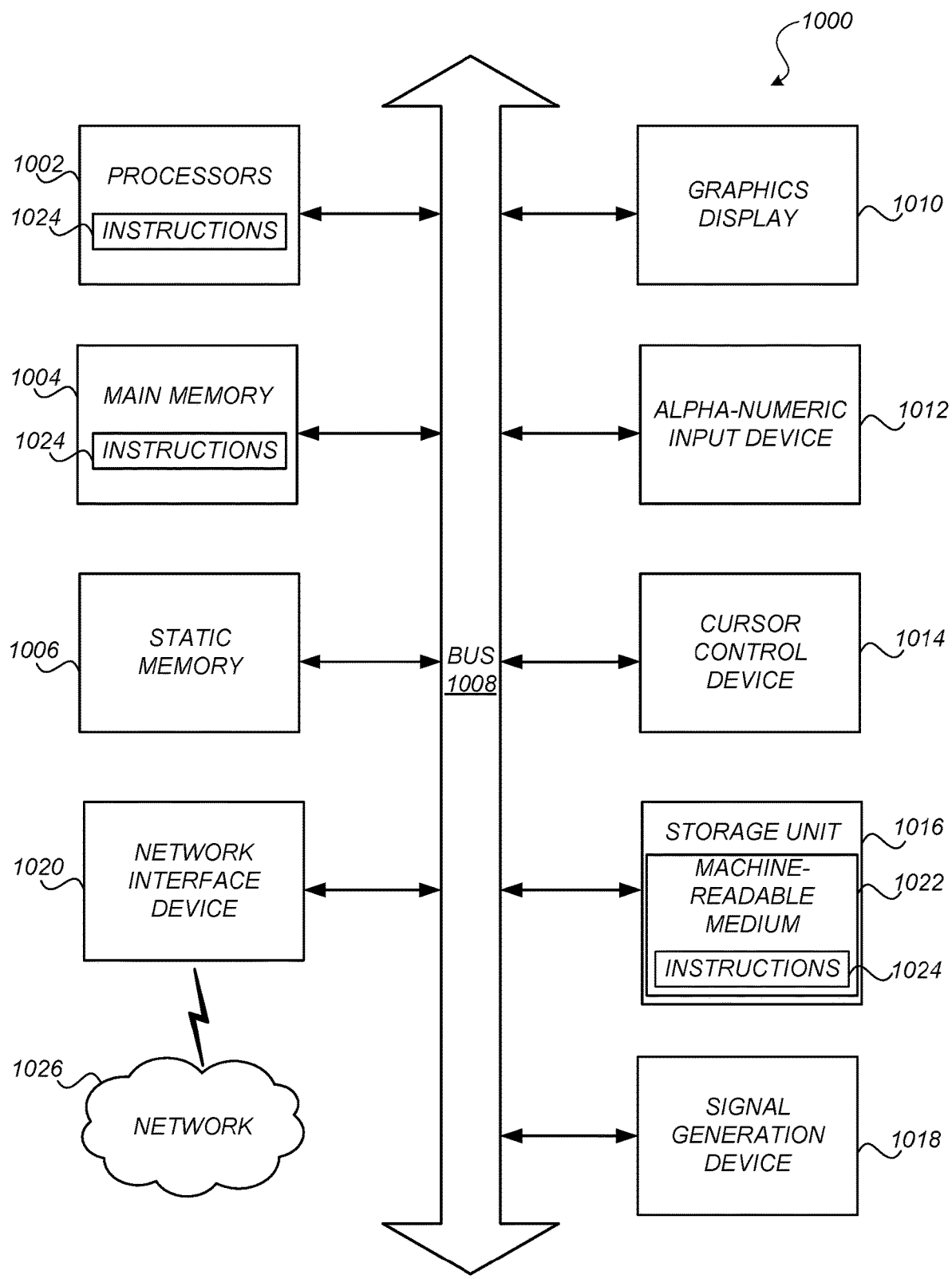
FIG. 10 is a block diagram illustrating components of an example computing machine, in accordance with an embodiment.

The computing server 120 may take the form of a combination of hardware and software. Some or all of the components of a computing machine of the computing server 120 is illustrated in FIG. 10. The computing server 120 may take different forms. In one embodiment, the computing server 120 may be a server computer that executes code instructions to perform various processes described herein. In another case, the computing server 120 may be a pool of computing devices that may be located at the same geographical location (e.g., a server room) or be distributed geographically (e.g., clouding computing, distributed computing, or in a virtual server network). The computing server 120 may also include one or more virtualization instances such as a container, a virtual machine, a virtual private server, a virtual kernel, or another suitable virtualization instance. The computing server 120 may provide various tasks of data analysis and process optimization to the domain 110 as a form of cloud-based software, such as software as a service (SaaS), through the network 140. Alternatively, or additionally, to the SaaS, the computing server 120 may provide on-premise software to the domain 110.

A client device (or client) 130 may be a computing device that can transmit and receive data via the network 140. Some or all of the components of a client device 130 is illustrated in FIG. 10. A client may be personnel, an expert, or an outside contractor of the domain 110. The client also may be referred to as a user or an end user of the computing server 120. The client device 130 also may be referred to as a user device or an end user device. A client may use the client device 130 to perform various process-related or resource-planning functions such as accessing, storing, creating, and modifying process models, defining key performance indicators or goals for optimizing process models, making corrections and labels to various automated tasks performed by computing server 120, receiving communications from the computing server 120 related to recommendations and suggested courses of action, and making queries to the computing server 120 regarding various process models such as why a particular model is not optimized. A client device 130 includes one or more applications 132 and user interfaces 114 that may display visual elements of the applications 132. The client devices 110 may be any computing devices. Examples of such client devices 120 include personal computers (PC), desktop computers, laptop computers, tablets (e.g., iPADs), smartphones, wearable electronic devices such as smartwatches, or any other suitable electronic devices.

The application 132 may be any suitable software applications that operate at the client device 130. A client device 130 may include various applications 132 such as a client-side version of the resource planning application 115 and software provided by the computing server 120 for process optimization. An application 132 may be of different types. In one case, an application 132 may be a web application that runs on JavaScript or other alternatives, such as TypeScript, etc. In the case of a web application, the application 132 cooperates with a web browser to render a front-end interface 134. In another case, an application 132 may be a mobile application. For example, the mobile application may run on Swift for iOS and other APPLE operating systems or on Java or another suitable language for ANDROID systems. In yet another case, an application 132 may be a software program that operates on a desktop computer that runs on an operating system such as LINUX, MICROSOFT WINDOWS, MAC OS, or CHROME OS.

An interface 134 may be a suitable interface for interacting with clients. The interface 134 may be used to display various visualizations of process models such as process maps and be used to receive inputs from the clients related to the process models and resource planning application 115. The client may communicate to the application 132 and the computing server 120 through the interface 134. The interface 134 may take different forms. In one embodiment, the interface 134 may be a web browser such as CHROME, FIREFOX, SAFARI, INTERNET EXPLORER, EDGE, etc. and the application 132 may be a web application that is run by the web browser. In another application, the interface 134 is part of the application 132. For example, the interface 134 may be the front-end component of a mobile application or a desktop application. The interface 134 also may be referred to as a graphical user interface (GUI) which includes graphical elements to display process maps. In another embodiment, the interface 134 may not include graphical elements but may communicate with the data management server 120 via other suitable ways such as application program interfaces (APIs).

The network 140 provides connections to the components of the system environment 100 through one or more sub-networks, which may include any combination of local area and/or wide area networks, using both wired and/or wireless communication systems. In one embodiment, a network 140 uses standard communications technologies and/or protocols. For example, a network 140 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 140 may be represented using any suitable format, such as hypertext markup language (HTML), extensible markup language (XML), JavaScript object notation (JSON), structured query language (SQL). In some embodiments, all or some of the communication links of a network 140 may be encrypted using any suitable technique or techniques such as secure sockets layer (SSL), transport layer security (TLS), virtual private networks (VPNs), Internet Protocol security (IPsec), etc. The network 140 also includes links and packet switching networks such as the Internet. In some cases, the computing server 120 may belong to a part of the internal computing system of the domain 110. In such cases, the network 140 may be a local network that enables the computing server 120 to communicate with the rest of the components of the domain 110.

Example Domain and Computing Server Components

Figure 2:
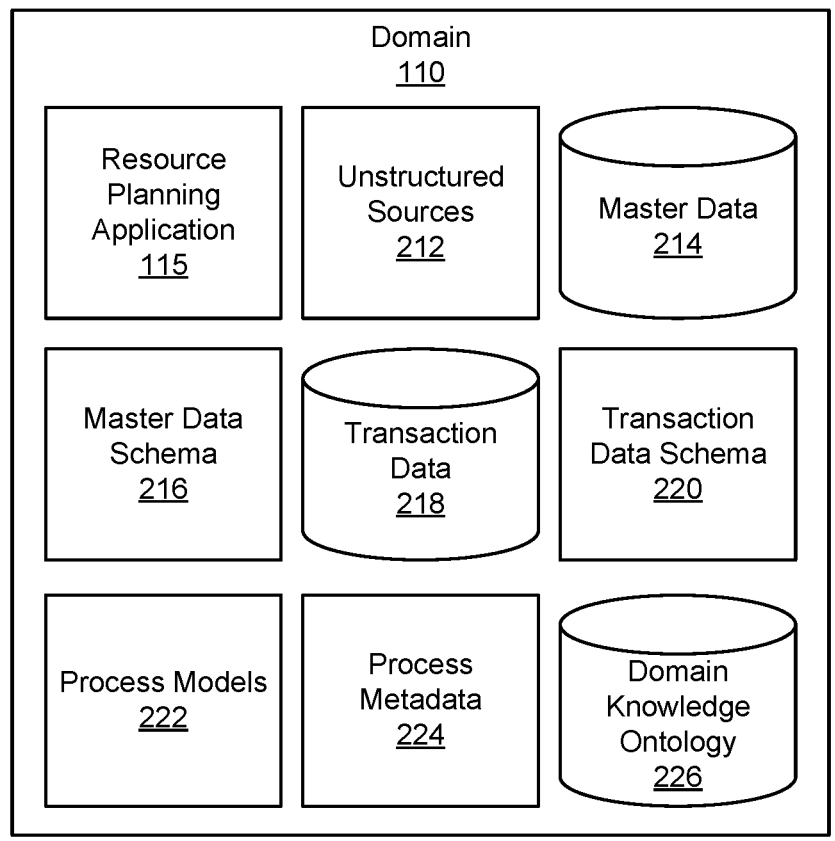
FIG. 2 includes block diagrams illustrating various components of an example domain and an example computing server, in accordance with an embodiment.
Figure 2:
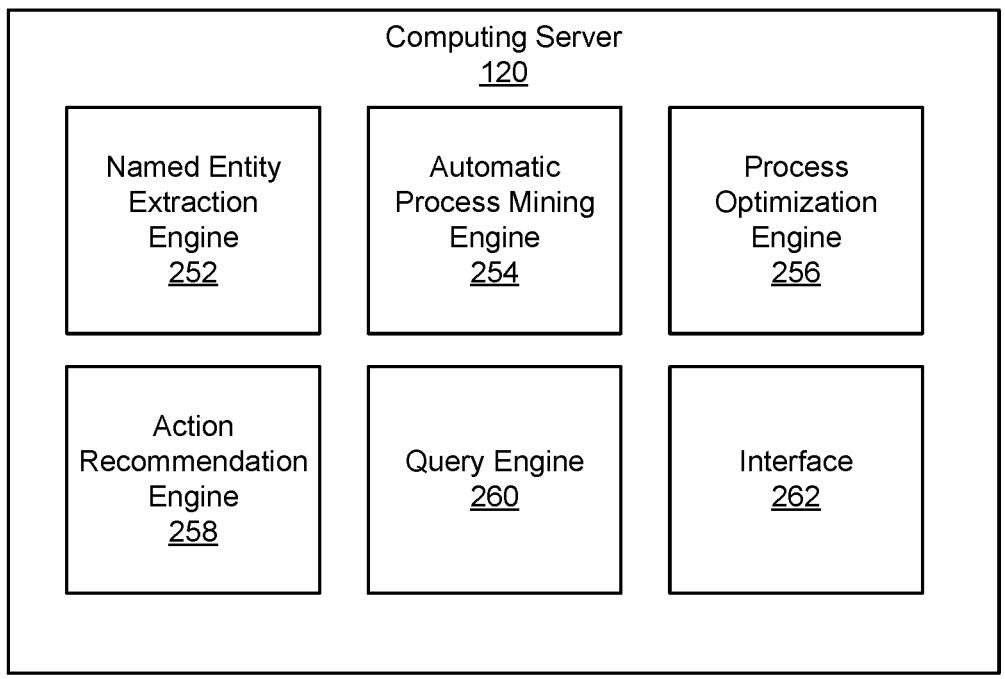

FIG. 2 is a block diagram illustrating various components of an example domain 110 and various components of an example computing server 120, in accordance with an embodiment. In various embodiments, the domain 110 and the computing server 120 may include fewer or additional components. The domain 110 and the computing server 120 also may include different components. The functions of various components in domain 110 and the computing server 120 may be distributed in a different manner than described below. Moreover, while each of the components in FIG. 2 may be described in a singular form, the components may present in plurality. Further, the components of the domain 110 and/or the computing server 120 may be embodied as modules comprised of software (e.g., program code comprised of instructions) that is stored on an electronic medium (e.g., memory and/or disk) and executable by a processing system (e.g., one or more processors and/or controllers). The components also could be embodied in hardware, e.g., field programmable gate arrays (FPGAs) and/or application specific integrated circuits (ASICs), that may include circuits alone or circuits in combination with firmware and/or software.

The domain 110 includes various data and ontology that defines the domain's knowledge, nomenclature, logic, and relationships. The domain 110 may include unstructured sources 212, master data 214, master data schema 216, transaction data 218, transaction data schema 220, organization process models 222, organization process metadata 224, and domain knowledge ontology 226. The data, structured or unstructured, may be stored in the same memory (e.g., the same hard drive) or distributed in various computing devices. The data may be accessed directly or through one or more resource planning applications 115.

Resource planning applications 115 may encompass various applications that allow personnel and other clients in the domain 110 to manage and analyze resources of the domain 110, such as entities, financials, transactions and processes associated with the domain 110. In one embodiment, a resource planning application 115 allows a client to input master data 214 and to define domain knowledge ontology 226. A resource planning application 115 may also manage a database for storing transaction data 218 in a structured manner such as by maintaining a structured query language (SQL) system for purchase orders, customer tickets, inventory entries, and other transaction data. A resource planning application 115 may also allow client devices (or clients) to build and adjust process models 222 associated with the domain 110. For example, a client may build a workflow for a product development cycle and define key personnel or departments needed for each step in the workflow. The domain 110 may include more than one resource planning application 115 and each of the applications 115 may be used for different tasks. In certain resource planning applications 115, the application 115 may also use artificial intelligence and other algorithms to automatically define master data 214 and domain knowledge ontology 226 for the domain 110.

Unstructured sources 212 includes various data sources that store information and data that are generated throughout the course of operations of the domain 110. Unstructured data often does not have a pre-defined data structure and may include a large amount of text. For example, unstructured data may include information that is in natural languages such as the text in emails. An email server that stores the emails of the domain's employees is an example of a data source that may serve as an unstructured source 212. Other examples of unstructured sources 212 may include documents, files, chat logs, PDF documents, word documents, text documents, scanned document images, etc. that are stored in different computers of the domain 110. Unstructured data may also include other information that is not entirely written in natural language or does not predominantly include text, such as call logs, machine logs (bot logs), process logs, etc. The different unstructured sources 212 and other structured sources may represent heterogeneous data sources of the domain 110.

Master data 214 may include information of relevant entities and objects in the domain 110. For example, master data 214 may describe parties, locations, and other objects around which the domain's businesses and events are conducted. The things that are recorded in the master data 214 may include customers, products, employees, assets, materials, suppliers, vendors, geographical locations, sites, etc. Master data 214 may be saved in a structured manner such as structured query language (SQL), another relational structure, or another suitable data format, which may include key-value pairs. For example, master data 214 may take the form of identifiers that may uniquely associate a named entity or another object of the domain 110 with a data entry. Master data 214 may also include extended attributes that describe the qualities and other characteristics of the named entities or other objects. An example entry of master data 214 for an employee of the domain 110 may include a unique identifier of the employee that takes the form of a hash or a uniform resource identifier (URI) as a primary key, a type identifier that identifies the entry as an entry for employees, metadata associated with the entry, name of the employee, and various values that describe characteristics such as email address, address, date of employment, etc. The example entry of master data 214 also may include other child entries such as keys of other structured entries that are associated with the employee. The child entries may or may not be master data 214. For example, the entry may include the keys of master data entries of customers to describe the relationships between the employee and the customers. The entry also may include the keys of transaction data entries to associate the employee with transactions that involve the employee.

The master data schema 216 describes the relationships, structure, and hierarchies of various types of master data 214. For example, the master data schema 216 may take the form of a blueprint that describes the structure of the database of the master data 214. The blueprint may include a collection of schema objects and the connections, structure, and hierarchies of the schema objects. Schema objects may include tables, sequences, synonyms, indexes, clusters, links, procedures, functions, etc. For example, the master data schema 216 may include a table that describes a type of master data entries (e.g., employee entries), the primary key and foreign keys allowed to be associated with the type of entries, fields of attributes that are available for the type of entries, and potential connections between fields and other types of entries. For example, a connection between a field in a first entry and another type of entry may indicate that a particular attribute for the first entry may be a foreign key that is linked to another table associated with another type of data. Components of the master data schema 216 may include, for example, tables, fields, field lengths, field types, field descriptions, foreign key relationships, primary key relationships, etc.

Transaction data 218 may include information about relevant activities and events that occur around the domain 110. For example, transaction data 218 may include sales, deliveries, invoices, claims, customer service tickets, and other interactions among various entities and objects associated with the domain 110. Transactions may include processes, steps, events, and activities. A process may include multiple events. For example, a sales process may include the events of purchasing, order confirmation, warehouse identification of products, and delivery. Each event may have multiple instances of the event (e.g., multiple instances of purchasing of the same item, by different customers). The instances of the event may be referred to as activities. Activities recorded in the transaction data 218 often may be associated with timestamps, although such timing information may be absent for some records. Transaction data 218 similarly may be saved in a structured manner such as structured query language (SQL), another relational structure, or another data format, which may include key-value pairs. For example, an entry of transaction data 218 for a manufacture event of the domain 110 may include a unique identifier that takes the form of a hash or a universal resource identifier (URI) as the primary key, a type identifier that identifies the type of process (e.g., the type is a manufacture sequence), metadata associated with the entry, objects and entities associated with the manufacture event (e.g., product codes, material identifiers, etc.), and timestamps for the key events in the process (time for raw material received, time for item completion, etc.).

In general, master data 214 may be associated with objects or entities of the domain 110 while transaction data 218 may be associated with temporal events occurring around those objects and entities.

Similar to master data schema 216, transaction data schema 220 describes the relationships, structure, and hierarchies of various types of transaction data 218. For example, the transaction data schema 220 may take the form of a blueprint that describes the structure of the database of the transaction data 218. The blueprint may include a collection of schema objects and the connections, structure, and hierarchies of the schema objects. Components of the transaction data schema 220 may include tables, fields, field lengths, field types, field descriptions, foreign key relationships, primary key relationships, etc.

Figure 8:
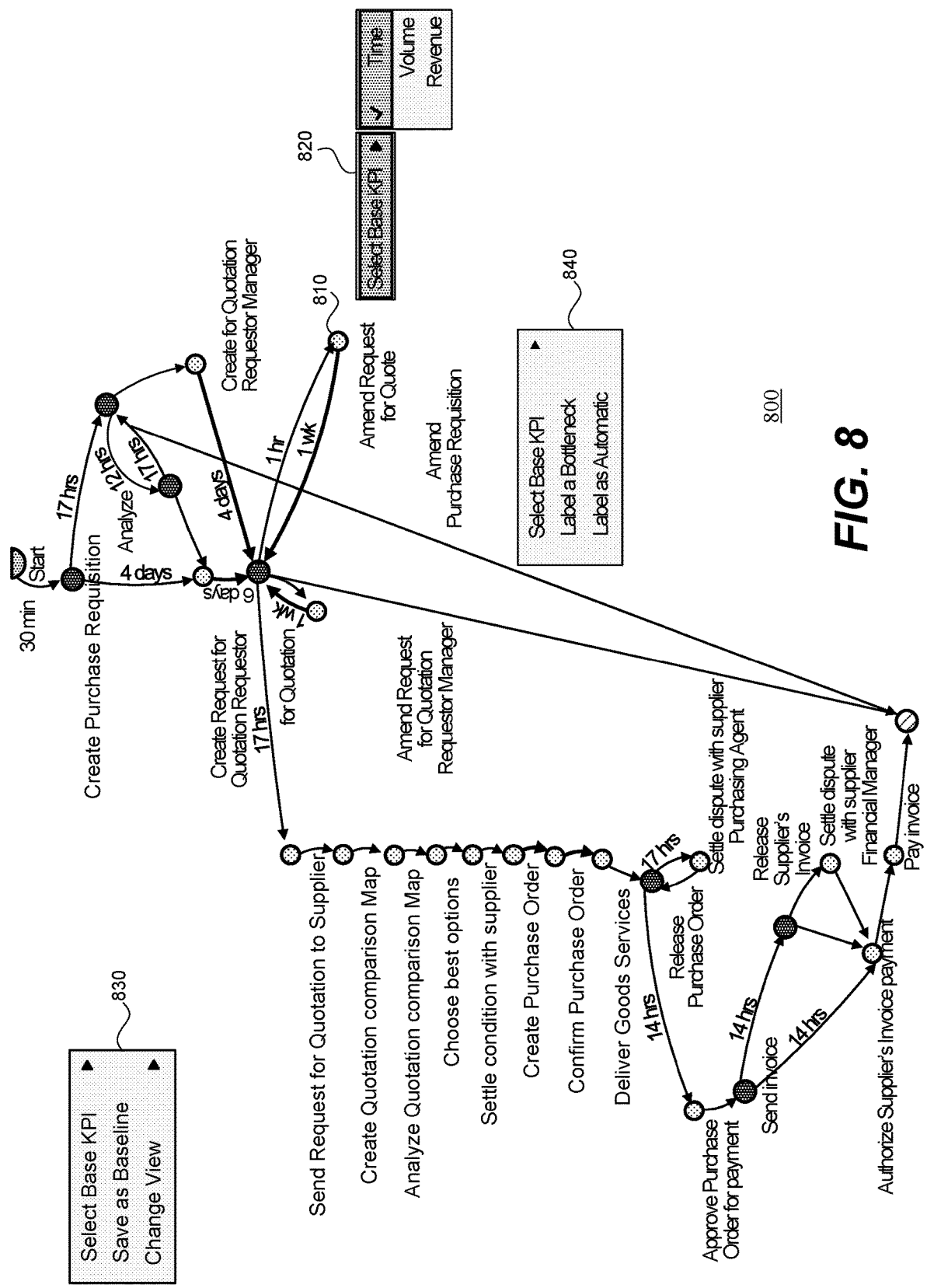
FIG. 8 is a conceptual diagram illustrating an example graphical user interface displaying a process map, in accordance with an embodiment.

The process models 222 may include data regarding various processes associated with the domain 110. For example, in a sales process, a process model as defined by the domain 110 may be a sequence of events that includes a confirmation of the order, a receipt of the payment, retrieval of items from a warehouse, a shipment of the items, a confirmation of delivery of the items, and the close of the sales transaction. In another example, in a manufacture process, an example process model as defined by the domain 110 may include reception of parts, storage of the parts, the creation of intermediate components, different stages of manufacturing, the packaging of the finished products, and storage of the products in a warehouse. The process model 222 may specify one or more responsible entities for each event. For example, in procurement, a manager in a domain 110 may need to approve the purchase. The process model 222 corresponding to the procurement process may identify the manager or type of manager needed for the step of purchase approval. The process models 222 may also store data and metadata related to the events in the process, such as timeline, an average time for a step, performance indicators associated with various steps, different possible routes in the process, and requirements associated with each step. A process model 222 may be defined manually by personnel of the domain 110 through a resource planning application 115. A process model 222 may also be automatically generated by the computing server 120 using an automatic processing mining engine 254 and further refined (manually or automatically). An example of visual representation of a process model 222 is illustrated in FIG. 8. A process model 222 may include the models, workflow stems, process definitions, and process relationships.

The domain 110 may initially create various process models 222 based on the practices of the domain 110. The domain 110 may receive refined or improved process models 222 based on suggestions of process variants transmitted from the computing server 120 after the computing server 120 analyzes and optimizes the process models 222 in manners that will be discussed in further detail in association with FIGS. 3-8. The process models 222 also may be edited manually by humans or machines. The process metadata 224 stores metadata regarding the process models 222, for example, the time of creation or modification of a process model, the author of a process model, changes in a process model, etc.

The domain knowledge ontology 226 may include data that represents definitions, knowledge, rules, logics, and relationships among concepts that may be specific to the domain 110. Domain knowledge ontology 226 may include policies, rules, and relationship definitions. For example, the ontology for a business domain may describe known business rules dependent or independent of a particular business context. An example piece of domain knowledge may be that shipment orders that start with the letter "I" are denoted as international shipment orders for a particular domain 110. Such a rule or practice may be captured in the ontology. Another example of domain knowledge may be related to relationships among employees of the domain 110. For example, a piece of domain knowledge ontology may link several employees together to indicate they are in the same group and to include information regarding who the manager and team members are in the group.

Domain knowledge ontology 226 may be represented in various suitable formats such as serialization entries. For example, domain knowledge ontology 226 may be saved in the format of the resource description framework (RDF) and/or web ontology language. Domain knowledge ontology 226 may include classes and relationships as the main components. A class may represent a concept such as a rule or a policy, an entity, and other objects in the domain 110. A relationship may describe the connection between two classes. The ontology also may map similar business entities and store parent-child relationships between business entities.

In one embodiment, the domain knowledge ontology 226 may be represented by data in an extensible markup language format such as RDF. The RDF format may be expressed as resource, property type, and property value triplets. The domain knowledge ontology 226 may represent an object (e.g., an entity, an item, a facility, a store) as a resource that is uniquely identifiable by a URI. The object in the form of a resource may be associated with different attributes that can be identified as property types. Each attribute value may be expressed as the property value. In other words, property types express the relationship of values associated with resources. Value may take the form of a text string or numbers that could be atomic in nature, of another divisible value, or of another resource. A description of a resource may be a collection of the relationships among different property types and values associated with the resource, which is linked to other resources through property value. Some of the resources in the domain knowledge ontology 226 may be entries of master data 214. The property types of some resources in the domain knowledge ontology 226 may be entries of master data 214 and entries of transaction data 218. For example, an entry of the domain knowledge ontology 226 may specify, within the domain 110, a store ABC (a resource) has a store manager (property type) who is John Smith (property value, also a resource), which is expressed as a triplet. John Smith in turn has other different property types such as email address (atomic text strings), employee identifier (number), supervisees (other resources), returns approved by the store manager (transaction data), etc. that can be expressed by other triplets. The entries for the store ABC, John Smith and his supervisees may be named entities that are stored as a part of the master data 214. The return records approved by John Smith may be stored as a part of transaction data 218.

In one embodiment, the domain knowledge ontology 226 may impose a syntax requirement such as a formal structure that is compatible with XML and may allow users to define semantics using various customizable namespace conventions designed by the users. The domain knowledge ontology 226 also may be associated with a schema that defines the relationship between different property types, types of resources, available property types for a particular kind of resources, etc. Miller, Eric, "An introduction to the resource description framework," Bulletin of the American Society for Information Science and Technology 25.1 (1998): 15-19 is incorporated by reference for all purposes.

Referring to the computing server 120 in FIG. 2, it includes various components that perform analysis of processes occurred around the domain 110. The computing server 120 may include a named entity extraction engine 252, an automatic process mining engine 254, a process optimization engine 256, an action recommendation engine 258, and an interface 262. The computing server 120 may rely on data of the domain 110, perform various analyses of the process models 222 of the domain 110, and automatically feed improved process models back to the domain 110. For example, the computing server 120 may retrieve various information such as data, metadata and schemas via suitable communication channels of the domain 110 such as through the application program interface (API) of one of the resource planning applications 115. The computing server 120 may perform calculations and analyses of the retrieved data and present the results through a graphical interface. The computing server 120 may also feedback the improved models and related data to the domain 110 via the API of the resource planning application 115. Each engine and component in the computing server 120 may include software algorithms that work with hardware as described in FIG. 10.

The named entity extraction engine 252 extracts named entities from various documents and files of the domain 110 such as from the unstructured sources 212. A named entity may be an object that is related to the domain 110, such as a person, a location, an organization, an item, an electronic product, etc. The named entity extraction engine 252 may automatically extract named entities from unstructured sources 132 to identify events that occur around the extracted named entities and to classify the extracted entities into master data 214. In one embodiment, the named entity extraction engine 252 may retrieve master data schema 216 and enrich the types of named entities in the master data schema 216 using domain knowledge ontology 226 to generates one or more RDF triplets that describe the relationships of the types of named entities. Based on the domain knowledge ontology 226 and the master data schema 216, the computing server 120 identifies targeted types of named entities to be extracted. The computing server 120 extracts named entities from unstructured data of the domain according to the targeted types of named entities identified. For example, the computing server 120 may retrieve unstructured data, convert the data into word embeddings, and input the word embedding into a machine learning algorithm such as a long short term memory recurrent neural network. The machine learning algorithm extracts named entities in the unstructured data and labels the extracted entities based on the type as identified in the master data 214 or the master data schema 216. The computing server 120 also may identify event sequences occurred around the extracted named entities. U.S. Pat. No. 10,607,704, issued on Mar. 31, 2020, entitled "Dynamically Trained Models of Named Entity Recognition over Unstructured Data," is hereby incorporated by reference in its entirety for all purposes and for a more detailed description on an example named entity extraction process.

The automatic process mining engine 254 automatically performs process mining to generate and refine one or more process models associated with the domain 110 based on the master data schema 216, the transaction data schema 220, the extracted named entities, and domain knowledge ontology 226. The automatic process mining engine 254 identifies named entities in unstructured data of the domain 110 based on the master data schema 216 and the transaction data schema 220. The automatic process mining engine 254 identifies activities associated with the named entities, based on various data sources such as unstructured sources 212. The automatic process mining engine 254 labels the activities with a timestamp to generate an activity sequence that arranges labeled activities in accordance with the timestamps. In one embodiment, the generation of the activity sequences may include representing the named entities as embedding vectors based on relationships among the named entities, inputting the activities that are associated with the embedding vectors into a machine learning algorithm, and generating the activity sequences using the machine learning algorithm. In one case, the machine learning algorithm is a long short term memory recurrent neural network.

The automatic process mining engine 254 may generate an event sequence from one or more similar activity sequences. An "activity" may refer to a specific instance of an occurrence of a similar "event." An event sequence may refer to a generalized sequence based on a summary of various activity sequences. For example, the automatic process mining engine 254 may extract, from various unstructured sources 212, different instances of sales of the same item. An activity sequence corresponding to the sales of the item may include a particular instance of the sale with a purchase number and a particular instance of delivery with a delivery number. Other activity sequences corresponding to the sales of the same item to different customers that are extracted by the automatic process mining engine 254 may be similar, but some of the sequences may include variations such as returns, multiple attempts to deliver, etc. From a number of extracted activity sequences, the automatic process mining engine 254 may generalize an event sequence that describes the process of selling the item in several generalized events, such as receipt of the order, order confirmation, outbound of the item from warehouse, delivery, etc. A process model may be constructed based on one or more event sequences. For example, several versions of event sequences corresponding to the same process may be generated because of variations occurred during transactions related to different instances of the process. A process model may be branched as a result. U.S. Pat. No. 10,592,544, issued on Mar. 17, 2020, entitled "Generation of Process Models in Domains with Unstructured Data," is hereby incorporated by reference in its entirety for all purposes and for a more detailed description on an example named entity extraction process.

The automatic process mining engine 254 may also identify one or more bottlenecks in a process model 222. The automatic process mining engine 254 identifies outliers in a process model. What constitutes an outlier may be defined by the users of the domain 110. For example, the automatic process mining engine 254 may use performance indicators to measure a process model that includes an outlier. The performance indicators, which may also be referred to as key performance indicators (KPI), may be user-defined. Examples of performance indicators include time, cost, labor, and other metrics that measure the quality of one or more steps in the process model. An outlier may be a step in the process model that is statistically outside the norm of average processes. For example, the same or otherwise comparable steps of various transactions may be modeled using a Gaussian distribution. The transactions that include steps having the performance indicators that are beyond a certain number of standard deviation (e.g., 3 standard deviations) may be labeled as outliers.

The process optimization engine 256 improves one or more process models 222 associated with the domain 110. The process models 222 may be the ones that are generated manually via a resource planning application 115 or the ones that are automatically generated by the automatic process mining engine 254. The process optimization engine 256 may generate a consolidated fact table that combines facts related to a process model 222 in a more structured fashion. The facts in the consolidated fact table may be drawn from various sources, including master data 214, master data schema 216, transaction data 218, transaction data schema 220, process models 222, domain knowledge ontology 226, and manual inputs such as user's selection of performance indicators. The process optimization engine 256 aggregates the master data 214, transaction data 218, and other suitable data to generate the consolidated fact table based on the domain knowledge ontology 226. The entries (e.g., rows) of the consolidated fact table may correspond to an instance of a transaction that is relevant to the process model 222. For example, the process model 222 may include multiple steps, and the process optimization engine 256 may identify one or more instances of the same step from various sources. The columns of the consolidated fact table may include various attributes of an instance of a transaction. For example, the columns can be event labels (e.g., "pay an invoice," "approve a purchase," "confirm delivery," "launch of beta testing," etc. depending on the type of process models), timestamp, named entities involved, the role of the named entities, etc. The columns of the consolidated fact table may be referred to as attributes of the process model. The columns may be dynamic based on the context of the process model 222 that needs to be optimized. To select the columns to be involved in a consolidated fact table, a user in the domain 110 may specific some of the initial columns as a baseline for the process optimization engine 256. The process optimization engine 256 may include one or more machine learning algorithms to continue to improve what columns need to be included in the consolidated fact table.

The process optimization engine 256 may apply one or more machine learning techniques to analyze the entries of the consolidated fact tables to determine aspects of a process model 222 that can be optimized. For example, the process optimization engine 256 may convert entries in the fact tables into vectors. The process optimization engine 256 inputs the vectors into one or more machine learning algorithms to generate one or more algorithm outputs that may correspond to an improved process model. The improvement may be with respect to a performance indicator that is selected by a user. The output of the machine learning algorithms may be further enhanced by domain knowledge ontology and manually corrected or refined by humans or robots. The improved process model may be fed back to the domain 110 to replace one of the existing process models 222. Details of the process optimization will be further discussed with reference to FIG. 3 through FIG. 8.

The action recommendation engine 258 may generate recommendations and courses of action to be taken that will improve a process model. In one embodiment, the action recommendation engine 258 may automatically route the recommendation to the appropriate agent. An agent can be personnel of the domain 110, a machine, a department of the domain 110, or another appropriate entity that can carry out an action in the process. The action recommendation engine 258 may extract process models 222 and automatically assign actions to appropriate agents. The action recommendation engine 258 may generate a recommendation for the domain 110 to take in order to improve a process model 222. For example, the action recommendation engine 258 may recommend skipping a step in the process model 222 to streamline the process, changing personnel in a certain step of a process, altering the route in a process, etc. The action recommendation engine 258 may also automatically route action items in a process model 222 to an agent that improves the process. For example, the action recommendation engine 258 may identify that agent A is more efficient than agent B due to agent B's backlog. The action recommendation engine 258 may automatically route a task that can be done by either agent A or agent B to agent A.

The action recommendation engine 258 identify a recommended action based on various machine learning techniques that analyze the data from various sources, including master data 214, master data schema 216, transaction data 218, transaction data schema 220, process models 222, domain knowledge ontology 226, and manual inputs such as user's selection of performance indicators. Similar to the process optimization engine 256, the action recommendation engine 258 may generate a consolidated fact table that combines facts related to a process model 222. The action recommendation engine 258 aggregates the master data 214 and transaction data 218 based on the domain knowledge ontology 226 to generate the fact table. The action recommendation engine 258 converts entries in the fact table into vectors. Based on the vectors, the action recommendation engine 258 identifies a step in the process model 222 as being statistically significant on impacting a performance indicator of the process model 222. The action recommendation engine 258, in turn, generates a recommended action associated with the step to improve the process model 222. The action recommendation engine 258 provides the recommended action to an agent associated with the domain 110. In some example embodiments, the recommendation engine comprises computing decision nodes that mimic a human brain by gathering data and analyzing it through a training mechanism so at to generate an output of what may be information of interest.

The query engine 260 may provide an interface for users to query information related to various process models 222. The query engine 260 aggregates the query with domain knowledge ontology 226. The query engine 260 returns results that are related to process models 222. For example, the queries may be related to attributes of the process models 222 (e.g., an average time of completion of a particular process, steps involved a process model), agents involved in a process model 222, reasons why a particular process model 222 is not optimized, recommendations on improving a process model 222, etc. The query engine 260 may operate in the format of database queries (e.g., SQL) or natural language queries. The query engine 260 may receive a natural language query and aggregate the query with domain knowledge ontology 226 to convert the natural language query into a database query to retrieve relevant data. The returned result may be in table format or in one or more natural language sentences.

The interface 262 may provide an interface to transmit and display results and data generated from the analysis performed by the computing server 120. For example, a process model 222 may be visualized as a process map. The interface 262 may be in the form of a graphical user interface (GUI) to display the process map and allow users to provide inputs via the GUI. A user may input manual actions to the process models 222. For example, a user may specify that a certain step is automated, eliminate a certain step in a process model 222 that is deemed unnecessary, and change one or more steps. The user may also provide feedback and corrections to a process model 222. For example, a process model 222 that is generated by automatic process mining engine 254 or optimized by the process optimization engine 256 may be corrected and further defined by a user input. The interface 262 may also receive performance indicators that are associated with a particular step or to an entire process. For example, a user may specify that the first step in a process model 222 is to be optimized based on time and the second step is to be optimized by cost. The interface 262 may take different forms. In one embodiment, the interface 262 may be an application interface that is provided and controlled by the computing server 120. For example, the computing server 120 may provide the results of its analysis through cloud-based SaaS. The interface 262 may be a front-end software application that can be installed, run, and/or displayed at a client device for users of the domain 110. The interface 262 also may take the form of a webpage interface of the computing server 120 to allow clients to access data and results through web browsers. The interface 262 may include a GUI that displays various results and data analyzed by the computing server 120, such as an identified bottleneck of a process and a suggest process variant. In another embodiment, the interface 262 may not include graphical elements but may provide other ways to communicate with the domain 110, such as application program interfaces (APIs).

Example Action Recommendations Workflow

Figure 3:
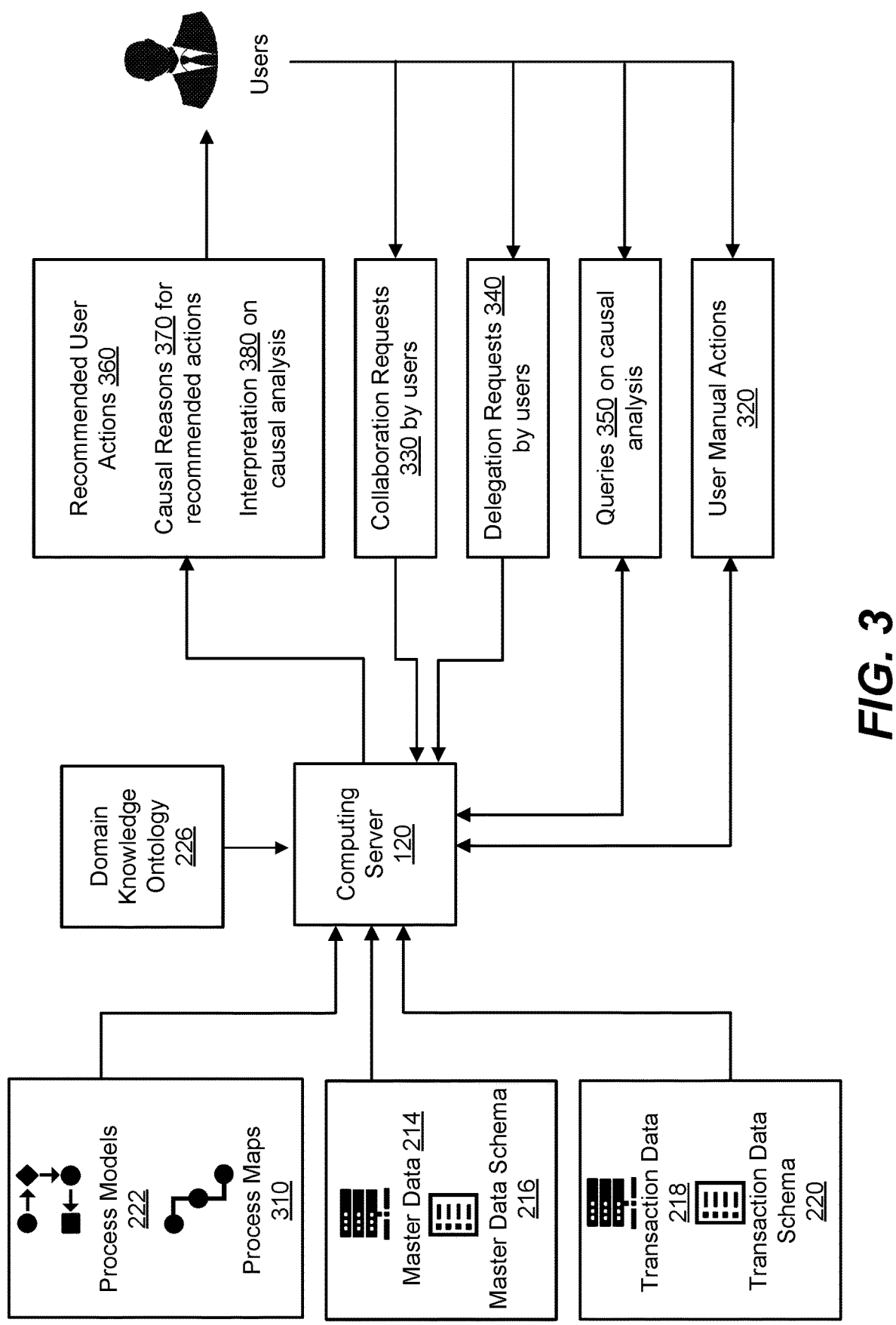
FIG. 3 is a block diagram illustrating example inputs and outputs of a computing server, in accordance with an embodiment.

FIG. 3 is a block diagram illustrating example inputs and outputs for the computing server 120 to perform action recommendations, in accordance with an embodiment. The process may include providing recommendations of actions to agents to improve a process model 222 in the domain, automatically and directly assigning actions to agents, and providing causal analyses and reasons for the recommended actions. As part of the action recommendation process, the computing server 120 may also monitor and record agent behaviors and actions. Agents may include employees, users, outside contractors, consultants, and machines of the domain 110. Various components of the computing server 120 may perform different actions related to the action recommendation process. For example, in one embodiment, the action recommendations and assignments may be carried by the action recommendation engine 258. The query engine 260 may work with the action recommendation engine 258 to provide causal analyses in a form of natural language results.

To perform tasks related to action recommendations, the computing server 120 may receive different data. The computing server 120 may communicate with the domain 110 through one or more communication channels, such as cloud synchronization and APIs. The computing server 120 may receive different data from the domain 110 (e.g., through an API provided by a resource planning application 115). The data retrieved from the computing server 120 may include process models 222 from resource planning application 115. The process models 222 may in a format that complies with the business process model and notation (BPMN). The computing server 120 may also receive process maps 310. A process map 310 may be a process model 222 that is automatically generated by the computing server 120, such as using the automatic process mining engine 254. An example of a visual representation of the process map 310 is shown in FIG. 8. In performing action recommendations, the computing server 120 may also receive master data 214, master data schema 216, transaction data 218, transaction data schema 220, and domain knowledge ontology 226. The input domain knowledge ontology 226 may be in an RDF format. The domain knowledge ontology 226 describes business rules, logics and relationships that may be dependent or independent of a particular business context. The domain knowledge ontology 226 may also map similar business entities and provide parent-child relationships among business entities.

In addition to, or alternative to, receiving data from the domain, the computing server 120 may receive data, actions, and/or requests from users of the domain 110. For example, the computing server 120 may also receive user manual actions 320. User manual actions 320 may include actions that are taken to improve the process model 222. For example, the user manual actions 320 may include a request for automation of a certain step in a process model 222, elimination of a step in the model, and a transformation of a step in the model. The computing server 120 may also receive performance indicators such as revenue, cost, time, etc. The user may specify which performance indicators are used to optimize the process models 222. A performance indicator can be step-specific or general to the entire process model 222. Different process models 222 may be associated with different performance indicators.

User-related actions may also include other activities such as delegation of a task from one user to another and collaboration of tasks among users. The computing server 120 may receive collaboration requests 330 by users. A user may request a certain task or step in a process model 222 to be shared with other users or agents. For example, an employee, who is currently indicated by the process model 222 as the point of contact of a certain step in the model, may enter a collaboration request 330 at the computing server 120 to invite or include her teammates to be members of record in the process model 222 with respect to the step or to be considered as one of the potential options for the computing server 120 to recommend or assign actions. A user may also send a collaboration request 330 to share and communicate with other users about the user's findings related to the process model 222 and causal analyses. For example, the user may take a user manual action 320 to change a step in a process model 222 and shared the change with others through a collaboration request 330.

Users in the domain 110 may also send delegation requests 340 to the computing server 120. A delegation request may include a request to assign an action from one agent to another. For example, a manager may send a delegation request 340 to assign an approval step in a process model 222 to one of her team members. The requestor does not need to be the current agent who is responsible for the task. For example, a manager may send a delegation request 340 for a task that is currently performed by a team member to an outside consultant. Also, the agent may not need to be a natural person. For example, a user may send a delegation request 340 for a task to be performed by a machine agent such as an A.I. agent.

The computing server 120 may also receive queries 350 on causal analyses. The queries 350 may be natural language based. For example, a user may enter a query to ask why a certain model is not optimized, where the bottleneck is for a process, which agents are responsible for various steps in a process model 222, why a task is recommended or assigned to a particular agent, and other information related to various process models 222.

The computing server 120, using one or more machine learning techniques, analyzes the data and queries received from various data sources and users and generates recommended user actions 360, causal reasons 370 for recommended actions, and interpretation 380 on causal analyses. In some cases, the outputs of the computing server 120 may also be natural language based.

Outputs of the computing server 120 may also be enriched by domain knowledge ontology 226. For example, the domain knowledge ontology 226 may include insight on the personnel involved in a process, specify certain estimated procedures of a step of a process model 222, and define special rules in a process model 222. The information in the domain knowledge ontology 226 may also be captured by the computing server 120 in process mining and other processes such as when collaboration requests 330 and delegation requests 340 are received. For example, in a drug development process, an approval from a certain department may be needed for a certain step, a delegation request 340 related to who can provide approval may be captured as a rule in the domain knowledge ontology 226. The enriched outputs may be provided as a result of a query. The result may take the form of a causal reason 370 and/or interpretation 380 on causal analyses. The result may be explained in one or more natural language sentences that are presented in a GUI, which may be part of the interface 134.

Figure 4:
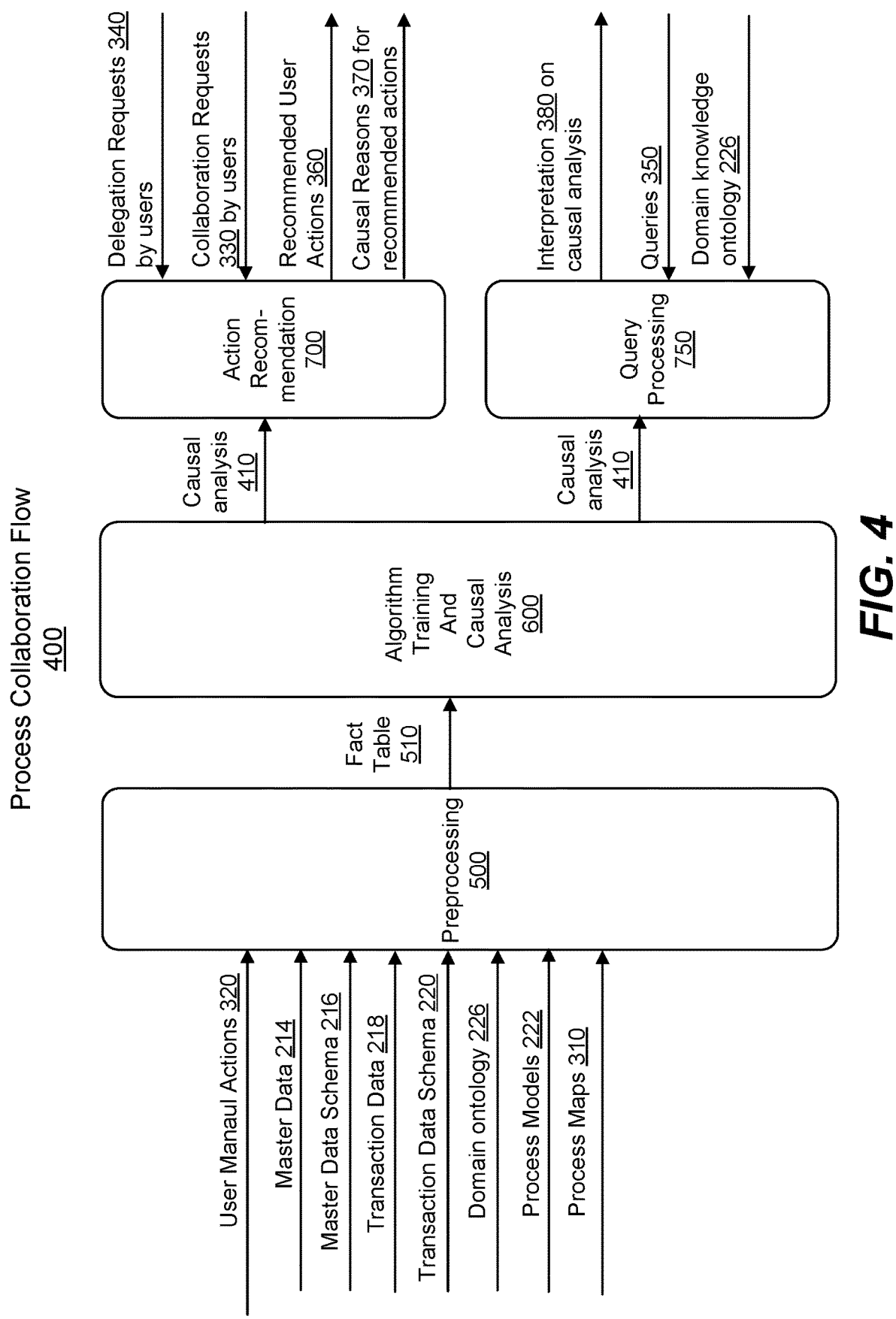
FIG. 4 is a flowchart illustrating an example process collaboration flow, in accordance with an embodiment.

FIG. 4 is a block diagram illustrating an example flow 400 for process collaboration, in accordance with an embodiment. The example process collaboration flow 400 may be performed by various components of the computing server 120, such as by the action recommendation engine 258 and the query engine 260. The example process collaboration flow 400 may include a pre-processing stage 500, an algorithm training and causal analysis stage 600, an action recommendation stage 700 and a query processing stage 750. A flow in accordance with other embodiments may include different, fewer or additional stages.

In the pre-processing stage 500 (also further described with FIG. 5), the computing server 120 receives one or more of the following types of data or inputs, such as user manual action 320 that might change or correct a target process model 222, the master data 214, the master data schema 216, the transaction data 218, the transaction data schema 220, the domain knowledge ontology 226, other process models 222, process maps 310 that might be previously automatically generated by the automatic processing mining engine 254 of the computing server 120, and the selection and criteria of performance indicators that may be set by a user to measure the optimization of a process model 222. In various embodiments, the computing server 120 may receive fewer, additional, or different data or inputs. In the preprocessing stage 500, the computing server 120 selects data that may be relevant to a target process model 222 that is in the process of being optimized. The computing server 120 aggregate the selected data based on the domain knowledge ontology 226 to generate a consolidated fact table 510 whose data will be used in the algorithm training and causal analysis stage 600.

In the algorithm training and causal analysis stage 600, the computing server 120 receives data in the fact table 510 and manual user manual actions 320 to identify actions and causal relations that may have impacts on the performance of process models 222. The causal analysis 410 may be performed by one or more machine learning algorithms, which may extract features of a process model 222 that is related to optimization. The computing server 120 may convert data entries in the fact table 510 into mathematical representations such as vectors. The data entries and user manual actions 320 in mathematical representations are input into one or more machine learning algorithms to identify features that are related to optimization of a process model 222, such as the steps that cause delay or increase in costs in the process model 222. The computing server 120 may rely on user manual actions 320, such as a manual change to a step, for the training of the machine learning algorithm. The computing server 120 may also rely on other optimized processed models as training samples to train the machine learning algorithm. The identified causal relations may be specific to one or more performance indicators. For example, a first causal relation may be related a recommended action that improves time while a second causal relation may be related to another recommend action that improves costs. The results of the machine learning algorithm are outputted as causal analysis 410 and are passed to action recommendation stage 700 and query processing stage 750.

In the action recommendation stage 700, the computing server 120 may receive one or more collaboration requests 330 and/or delegation requests 340 from devices associated with users of the domain 110. The computing server 120 receives causal analysis 410 from the algorithm training and causal analysis stage 600. The computing server 120 generates recommended user actions 360 and provides analysis to the users on the causal reasons 370 for the recommended actions. The computing server 120 may facilitate the collaboration requests 330 among the users. The collaboration may be in the context of process model 222 and the generated casual analyses 410. For example, the computing server 120 may identify certain steps in a process model have caused a delay in the process due to repeated back and forth between two teams. In response to a collaboration request 330, the computing server 120 may invite two teams to collaborate on those steps to streamline the process. The computing server 120 may also facilitate the delegation requests 340 by assigning actions to an appropriate agent. For example, the causal analysis 410 may indicate that a task should be performed by a certain agent but the computing server 120 may re-route the task to another agent based on a delegation request 340. The assignment of a task may occur when a process progresses to the stage for the task to be performed.

In the query processing stage 750, the computing server 120 may receive queries 350 from the users via a client device that inquire about information and causal reasoning related to various process models 222 and the model optimization. The computing server 120 may enrich the queries 350 using domain knowledge ontology 226 to put the queries 350 in the context of the relevant process model 222. Depending on the scope of the queries 350, the computing server 120 may receive causal analysis 410 from algorithm training and causal analysis stage 600 to identify the reasoning of certain optimization steps and recommendations.

The queries 350 may be in the form of natural language queries. The computing server 210, using domain knowledge ontology 226, may turn the queries into a structured language such as SQL queries and retrieve data from one or more databases such as master data 214 and transaction data 218. The computing server 120 may provide answers in the form data table and/or natural language results to provide interpretations 380 on the causal analyses and process models 222.

Example Preprocessing Stage

Figure 5:
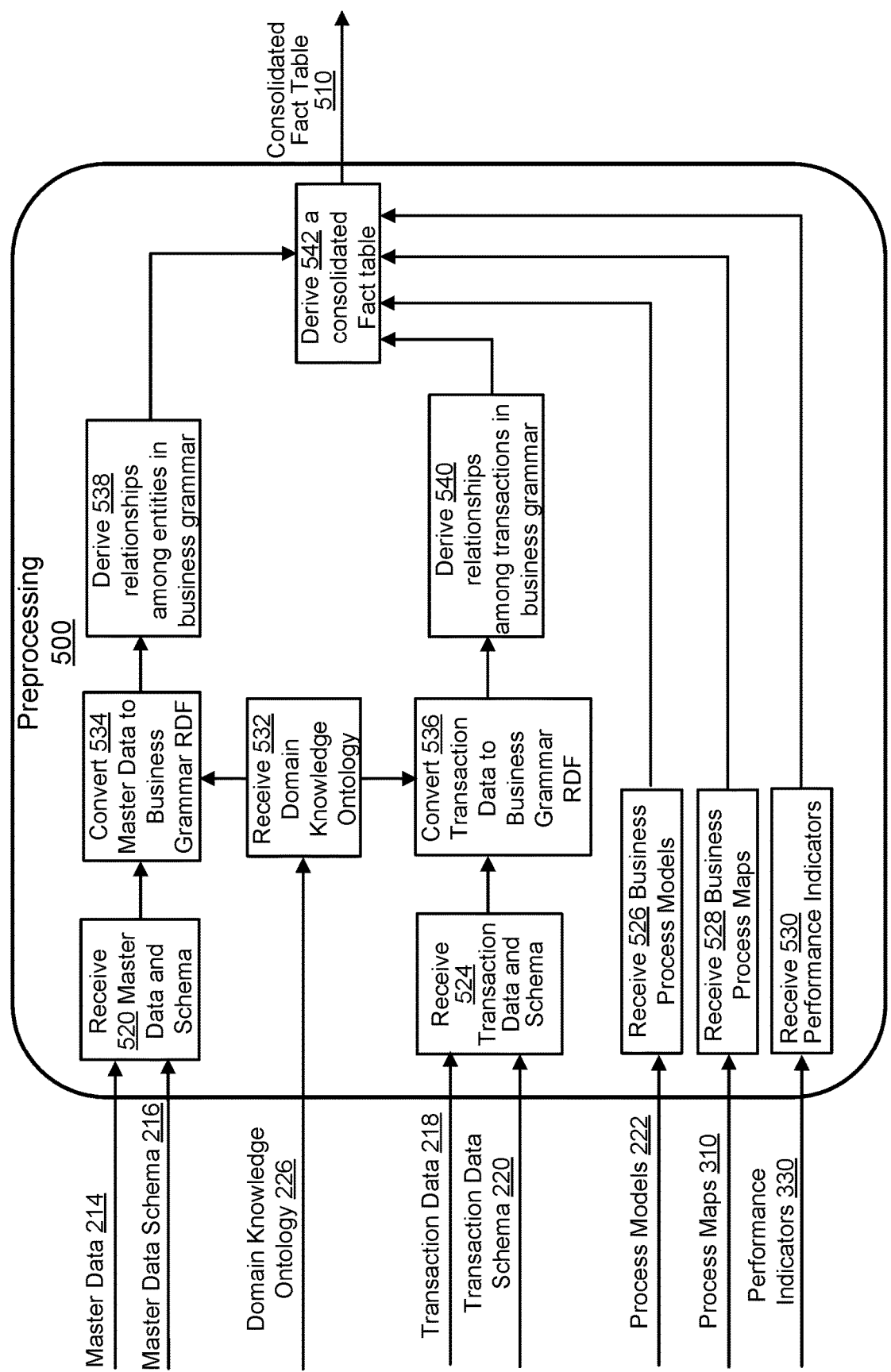
FIG. 5 is a block diagram illustrating an example preprocessing stage, in accordance with an embodiment.

FIG. 5 is a flowchart illustrating an example preprocessing stage 500, in accordance with an embodiment. In this preprocessing stage 500, the computing server 120 may generate a consolidated fact table that includes entries of activities and associated entities that may be relevant to a target process model 222. The detail described in FIG. 5 is an example implementation of the preprocessing stage 500. In various embodiments, other variations of the preprocessing stage 500 may also be possible. In various embodiments, one or more steps shown the flow shown in FIG. 5 may be skipped or changed. Other steps that are not shown in FIG. 5 may also be added. The preprocessing stage 500 may be carried out by various components of the computing server 120, such as the process optimization engine 256 or the action recommendation engine 258.

In an example preprocessing stage 500, the computing server 120 may receive 520 master data 214 and master data schema 216 and receives 524 transaction data 218 and transaction data schema 220. The master data schema 216 and the transaction data schema 220 may include fields, field lengths, field types, field descriptions, foreign key relationships, primary key relationships of the master data 214 and the transaction data 218 respectively.

The computing server 120 may also receive 526 one or more existing process models 222 of a domain 110. The existing process models may include process models 222 that may be manually built by users of a domain 110 in the format of BPMN and saved in a resource planning application 115. The computing server 120 may also receive 528 other types of existing process models 222, which may include process maps 310 that may be previously generated by the computing server 130 automatically. The types of process models 222 (including process maps 310) received by the computing server 130 may depend on the context. The received process models 222 may include a target process model that needs to be optimized, similar or related process models, and other process models that may be used for the model training in the algorithm training and causal analysis stage 600. The process models 222 received by computing server 120 may include the models, workflow stems, process definitions, and process relationships.

The computing server 120 also may receive 530 performance indicators that are specified by the users of the domain 110 for the optimization goals. For example, the performance indicators may include one or more threshold values specified by the users to define the optimization goals.

The computing server 120 aggregates, based on the domain knowledge ontology 226 of the domain, the master data 214 and the transaction data 218 to generate a consolidated fact table. The aggregation process may include receiving 532 the domain knowledge ontology 226. The computing server 120, based on the domain knowledge ontology 226, derives the relationship of entities in the master data 214 and the transaction data 218. For example, the computing server 120 may convert 534 master data 214 and master data schema 216 to RDF based business grammar, which may be represented as a semantic triplet with the named entities. The relationship between named entities may be derived from the RDF based business grammar. The computing server 120 may also convert 536 transaction data 218 and the transaction data schema 220 to business grammar RDFs. The domain knowledge ontology 226 may include relationships, rules, and definitions that provide a framework for the conversion of master data and transaction data into business grammar RDFs. The domain knowledge ontology 226 may also include existing business grammar RDFs. Related RDFs can be linked. Based on the connections among the RDFs, the computing server 120 derives 538 relationships among entities in business grammar. The computing server 120 also derives 540 relationships among transactions in business grammar. The computing server 120 may convert the relationships of the entities into serialization entries, such as in the format of RDFs.

The computing server 120 derives 542 a consolidated fact table 510 from the relationships among entities and transactions, the process models 222, process maps 310, and performance indicators. The consolidated fact table 510 may include entries (e.g., rows in the table) that include various attributes. Each entry may correspond to an instance of a relationship or a transaction. For example, if the target process model 222 is related to a research and development process, the entries in the fact table 510 may correspond to different instances of development stages. The entries may include attributes such as the named entities (e.g., engineers) who were involved, time spent on each stage, whether the result of a stage was implemented, etc. In another example, if the target process model 222 is related to the sales transaction of a particular type of product, the entries in the fact table 510 may correspond to different events involved in the sales of different items that belong to the type of product. Those events may include sending an invoice, receipt of payment, confirming a purchase, delivery of goods, settling conditions, etc. The entries may include attributes such as the cost of each item, the named entities involved, the delivery cost, the time of delivery, for different instances of the events.

Whether the attributes (e.g., columns in the consolidated fact table 510) of entries are deemed by the computing server 120 as relevant to be included in the consolidated fact table 510 may depend on the context of the target process model 222 to be optimized. The selection of the attributes (e.g., whether a column should be present in the consolidated fact table 510) may depend on the information in the target process model 222, the specified performance indicators, and the domain knowledge ontology 226. For example, the target process model 222 may identify certain steps in the process model 222 as required. Attributes in the process model 222 related to those steps may be included as the columns in the consolidated fact table 510. In another case, performance indicators specified by the users of the domain 110 may have an impact on the selection of attributes. For example, if the performance indicator is time instead of cost, timestamps of start and completion of events will be more likely to be selected as the attributes compared to the money spent for a step in the process. The RDFs and related business grammar may also affect the selection of the attributes. For example, if an RDF specifies that a step requires approval from a manager due to compliance requirements, the name and positions of the managers who can approve the step will be more likely to be selected as the attributes in the consolidated fact table 510.

The selection of the attributes by the computing server 120 may be based on manual commands from users of the domain 110 (e.g., experts who are tasked with helping to optimize various business processes in the domain 110), based on machine learning algorithms that are dynamically trained to learn how to select which attributes to be included based on the process model 222, the performance indicators, and the domain knowledge ontology 226, or based on a combination of both automatic selection and manual correction. In one embodiment, users of the domain 110 may select attributes that need to be included for a given process model. The computing server 120, in turn, selects data of the attributes to be included in the consolidated fact table 510. In another embodiment, training samples may be given for the computing server 120 to train a machine learning algorithm to select attributes to be included in the consolidated fact table 510. For example, positive training samples may include various types of process models and each sample may include attributes that are manually identified as relevant to a particular process model. Negative training samples may each include attributes that are manually determined as not relevant to a particular process model. The computing server 120 may train a machine learning algorithm, such as a regression model, a support vector machine, a decision tree model (e.g., random forest), a neural network to identify attributes that need to be included in a consolidated fact table 510. In yet another embodiment, manually selected data may serve as a baseline for the selection of attributes. The computing server 120 dynamically train a machine learning algorithm to further improve the selection of attributes. The selection may also be adjusted or forced by a user manually via the client device.

For a particular attribute selected to be included in the consolidated fact table 510, data of the attribute for each entry may be derived from various data sources such as the master data 214, master data schema 216, the transaction data 218, the transaction data schema 220, the domain knowledge ontology 226, the process model 222, and various relationships specified in business grammar RDFs. For example, the RDFs may specify relationships that allow the computing server 120 to trace back to the master data 210 for the named entities that are involved in a particular instance of an event. The master data 214 and the transaction data 218 may also be organized in a structured manner that allows certain attributes in the master data 214 and the transaction data 218 to be transferred to the consolidated fact table 510. In one case, to construct the consolidated fact table 510, the computing server 120 may scan through the transaction data 218 to identify each entry that should be included in the consolidated fact table 510 and search other data sources for data of attributes that are not included in the transaction data 218. The consolidated fact table 510 is outputted to the algorithm training and causal analysis stage 600.

While the term consolidated fact table is used in this disclosure in relationship with the preprocessing stage 500, the aggregated fact entries generated in the preprocessing stage 500 may include entries that may be presented in formats other than a tabular form. For example, the entries may also be presented in other formats such as arrays, tensors, matrices, key-value pairs, a markup language such as XML, JSON, Pandas, data frames, etc. The term consolidated fact table refers to aggregated entries that are presented in any suitable formats that may or may not involve rows and columns.

Example Algorithm Training and Causal Analysis

Figure 6:
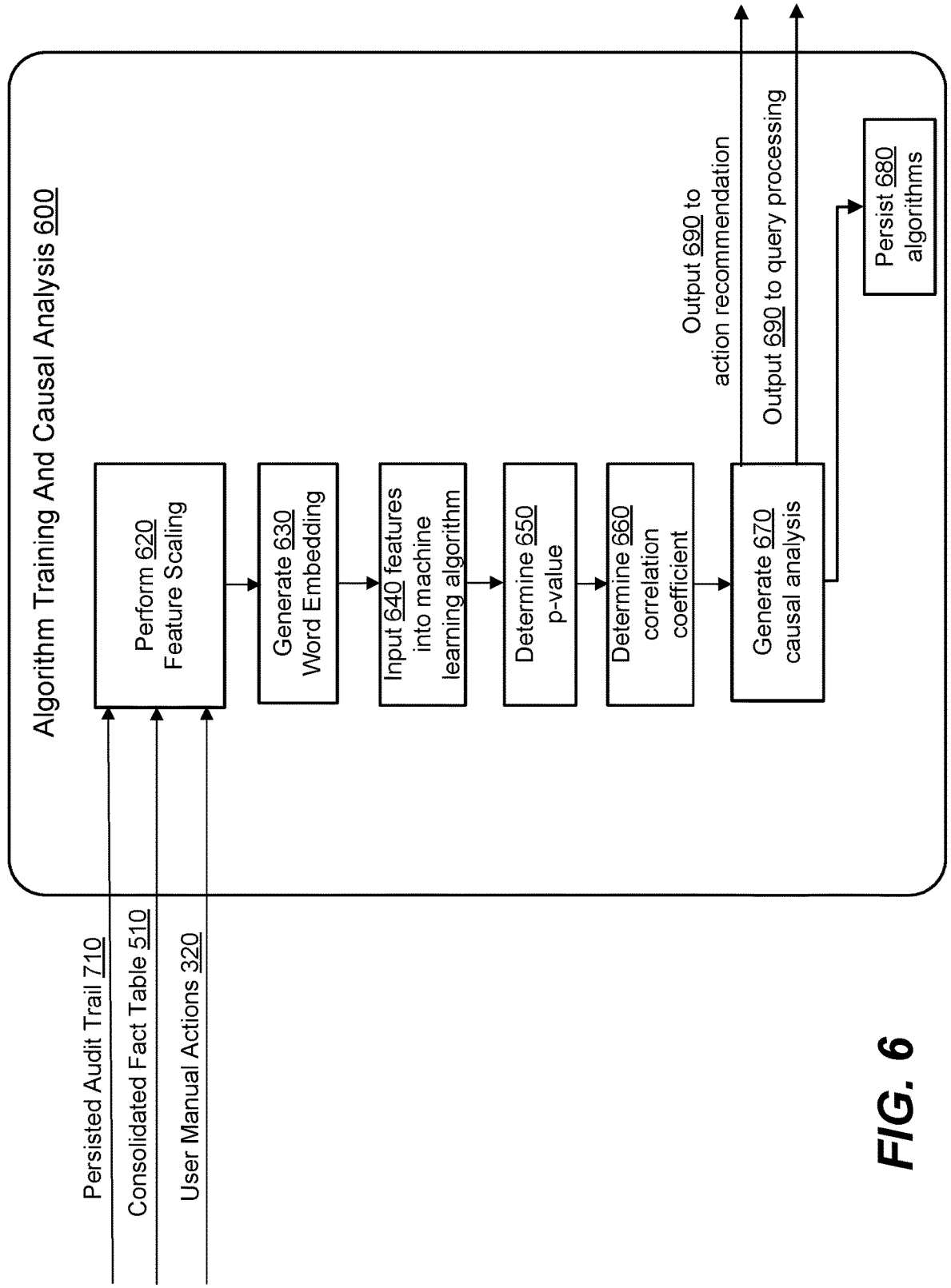
FIG. 6 is a block diagram illustrating an example flow of algorithm training and causal analysis stage, in accordance with an embodiment.

FIG. 6 is a flowchart illustrating an example algorithm training and causal analysis stage 600, in accordance with an embodiment. In this algorithm training and causal analysis stage 600, the computing server 120 may apply various machine learning techniques, train one or more machine learning algorithms, and execute the machine learning algorithms to perform causal analyses related to a process model 222. The detail described in FIG. 6 is an example implementation of the algorithm training and causal analysis stage 600. In various embodiments, other variations of stage 600 may also be possible. For example, the type of machine learning algorithms used (e.g., a regression model) may be replaced by other types of machine learning algorithms (e.g., a support vector machine, decision tree model). In various embodiments, one or more steps shown the flow shown in FIG. 6 may be skipped or changed. Other steps that are not shown in FIG. 6 may also be added. The algorithm training and causal analysis stage 600 may be carried out by various components of the computing server 120, such as the action recommendation engine 258.

The computing server 120 may receive the consolidated fact table 510, user manual actions 320 and persisted audit trail 710. The consolidated fact table 510 may include entries relevant to a target process model 222 that are extracted from various data sources from the domain 110, such as master data 214, transaction data 218, and the domain knowledge ontology 226. The user manual actions 320 includes manual actions of users that are used or selected to improve the target process model 222. The manual actions may be input through a client device. Example actions may include selections of automation of one or more steps in the process model 222, elimination of one or more steps in the process model 222, and transformation of one or more steps in the process model 222. Based on different actions, the recommendation to improve a process model 222 may be categorized by different classes (automation, elimination, transformation, etc.). The user manual actions 320 may serve as a baseline for labels on whether some of the steps in process models 222 may be optimized, automated, removed, etc. For example, the user manual actions 320 could serve as initial inputs for the training of the machine learning algorithms in the algorithm training and causal analysis stage 600. Some user manual actions 320 may also serve as the output of some of the machine learning algorithms. For example, some user manual actions 320 may specify a requirement in the process model 222 that should be adopted in recommending an action. The persisted audit trail 710 may be fed back from the action recommendation stage 700. The persisted audit trail 710 may include verifications of recommended actions that are manually verified by users of the domain 110. The persisted audit trail 710 may be used to reinforce the training of the machine learning algorithms and the causal analyses.

To input entries in the fact table 510 into one or more machine learning algorithms, the computing server 120 may convert the entries in the fact table 510 into vectors. The computing server 120 may perform 620 feature scaling on the entries in the fact table 510 and the user manual actions 320 to scale the numerical representations of the attributes in the entries and in the user manual actions 320. For example, the computing server may normalize the range of the features (e.g., numerical representations of attributes in the entries) so that the raw data have comparable ranges. Normalizing the ranges of the features may prevent a certain feature (e.g., a certain column in the fact table 510) from dominating the effect on the machine learning algorithms. Examples of suitable feature scaling may include any suitable normalization or standardization techniques, such as min-max scaling, standard deviation scaling, mean normalization, z-score normalization, scaling to a unit length, quantile transformer scaling, and power transformer scaling.

The computing server 120 may also generate 630 embedding vectors (e.g., word embedding) for text features in the entries. Some of the attributes in the entries of the fact table 510 may be represented by numerical values while other attributes may include text. For the text attributes, embedding vectors may be generated to represent the text as a feature. A word embedding may be a vector in an n-dimensional space that represents the semantic relationships of the word relative to other words presented in a corpus. The corpus in generating the word embeddings may include documents of the organization and documents from the domain 110 or even documents from external sources. The computing server 120 generates word embeddings based on the named entities that labeled, the label values, text context, label position in the text contexts. For example, in a transaction record, "Peter purchased a refrigerator model #123 at Santa Monica store" may be labeled with various label values by named entities recognition as "[Peter]$_{customer}$ purchased a [refrigerator]$_{item}$ model [#123]$_{model\_num}$ at [Santa Monica store]$_{store\_ID}$." The labels, text context, label position may be converted into numerical representation in different dimensions of the word embeddings. Pennington, Jeffrey, Richard Socher, and Christopher Manning, "Glove: Global vectors for word representation," Proceedings of the 2014 Conference on Empirical Methods in Natural Language Processing (EMNLP), 2014 is hereby incorporated by reference for all purposes.

The attributes in the entries of the fact table 510 may be continuous variables that are representable by numerical values, categorical variables whose labels of category can be converted to numerical values, or text variables. For example, for attributes that can be represented by numerical values, those attributes may be scaled by feature scaling. For text attributes, word embedding may be generated as part of a feature vector. The embedding may also be scaled by feature scaling. Other suitable techniques to generate feature vectors are also possible.

The computing server 120 may input 640 the features vectors into a machine learning algorithm to identify, based on the vectors, an attribute (e.g., a characteristic, an event, a step) in the process model as being statistically significant on impacting the process model 222. In this context, although the attribute is referred to as its singular form for simplicity, identification of an attribute may include identification of one or more attributes that have statistically significant impact on the process model 222. For example, the machine learning algorithm may identify more than one attribute. In another case, the machine learning algorithm may be executed repeatedly with respect to different features in data entries of the consolidated fact table 510 to identify more than one attribute. The algorithm output may classify and predict recommended actions for users. In one embodiment, the computing server 120 stores a machine learning algorithm to identify the attribute. The machine learning algorithm may be a fully trained model or a dynamically trained model, which may be initially partially trained and continued to be trained with additional training samples.

The identification of an attribute in the process model 222 may include receiving a performance indicator (e.g., time, costs, revenues, etc.). The computing server 120 may input the vectors into an algorithm to identify a correlation between a candidate attribute and the performance indicator. The computing server may determine 650 the p-value associated with the candidate attribute. The p-value may be used for hypothesis testing on whether the candidate attribute has an impact on the process model 222 that is measured in terms of the performance indicator. For example, a null hypothesis may be assumed that an attribute has no statistically significant impact on the process independent of any other factors. The computing server 120, determines, based on the p-value, whether the attribute is statistically significant on impacting the performance indicator. For example, a p-value less than 0.05 may be defined as statistically significant. In other embodiments, the threshold of 0.01, 0.005, 0.001, etc. may also be used for the p-value. Other types of statistical analysis and hypothesis testing may be used, such as effect size, confidence interval, Bayes factors, Fisher's exact test.

The computing server 120 may determine 660 correlation coefficients for various attributes. The performance of the process model 222 may be represented by one or more metrics. The metrics may be the performance indicators, such as time, costs, revenue. The process model 222 may also be associated with a plurality of attributes that are included as columns in the consolidated fact table 510. Each attribute may be associated with a correlation coefficient that represents the degree of correlation between the attribute and the performance metric. Any suitable statistical correlation coefficient may be used, such as Pearson's correlation coefficient, sample correlation coefficient, population correlation coefficient, and correlation matrices. Based on the correlation coefficient, a causal relationship between an attribute and the process model 222 may be determined. A causal relationship between an event in the process model 222 and the process model 222 may also be determined based on the attributes of the event. The computing server 120 generates 670 the causal analysis 410 as outputs of the machine learning algorithm. In addition to, or alternative to, modeling an entire process model 222, the causal analysis 410 may also include causal relationships for a particular attribute in the process model 222.

The machine learning algorithm used may be a regression algorithm such as a linear regression algorithm. Another suitable machine algorithm such as a support vector machine, a decision tree model, and a neural network may also be used. In one embodiment, the degree of optimization of the process model 222 (or one or more steps in the process model 222) may be modeled by one or more performance indicators, such as the total time of completion of an instance of the process. The prediction of the value of a performance indicator may be modeled as a combination of various attribute values and coefficients associated with the attributes. For example, in a linear regression algorithm, the value of the performance indicator may be a linear combination of various attribute values, each multiplied by the attribute's corresponding coefficient (e.g., performance indicator=$k_1 x_1 + k_2 x_2 + \ldots + k_i$ and $x_i$ are respectively the coefficient and the attribute value. In a non-linear regression algorithm, one or more attributes may be associated with an exponential power. Other machine learning algorithms, such as a support vector machine or a neural network, the algorithms may also include coefficients. In an untrained machine learning algorithm, the coefficient values are unknown or have not been accurately determined.

The computing server 120 may perform training of the machine learning algorithm. The training samples may include transactions that correspond to one or more steps in the process model 222. Each training sample may be associated with a value of the performance indicator. For example, each training sample may be an instance of the process and the value of the performance indicator for each instance may be the total time took to complete the instance of the process. An instance of transaction used as a training sample also include various attributes. For example, a step in a process model 222 may be an invoice approval step. The step may be associated with various attributes such as the type of invoice, the charge amount, the person who approved the invoice, the time it took to approve the invoice, etc. The values of the attributes may be generated when the training samples are converted to vectors in steps 620 and 630, in which the computing server 120 converts the transactions as feature vectors with values of the attributes as features in the vectors.

The training of a machine learning algorithm may include an iterative approach to gradually determine, using data of the training set, the appropriate values for the coefficients. Training the machine learning algorithm may include forward propagation and back propagation. In forward propagation, the machine learning algorithm relies on the values coefficients in the current iteration to make a prediction of the value of the performance indicator. For example, the computing server 120 may input the feature vector representing a transaction for the machine learning algorithm to make a prediction of how long the transaction took to complete. The predicted value of the performance indicator is compared to the actual value of the performance indicator extracted from the domain's system of records, such as from the transaction data 218. The machine learning algorithm may be associated with an objective function such as a loss function that determines how well the machine learning algorithm makes predictions for the overall training set (e.g., what is the average error of the predicted values) in a given iteration. In back propagation, the computing server 120 uses techniques such as coordinate descent to adjust the values of the coefficients in a direction that is projected to improve the value of the objective function. In the next iteration, forward propagation is executed again to make a new round of predictions using the newly adjusted values of the coefficients. Forward and back propagations are executed in multiple iterations to continue to improve the performance of the machine learning algorithm. Training may be completed when the model converges (e.g., the value of the objective function no longer improves notably) or after a predetermined number of iterations. Based on a trained machine learning algorithm, such as a linear regression algorithm, the computing server may determine 650 the p-value for each attribute. In some cases, the p-value of an attribute in the process 222 may also be identified based on the regression model.

After certain attributes that are statistically significant on the impact the process model 222 and correlation coefficients of those attributes are identified, the computing server 120 may generate 670 causal analysis 410. The causal analysis 410 may include the degree of impact on a certain step on the process model 222. For example, the causal analyses may find that the employee involved (an attribute) in a step significantly impacts the length of the process. The causal analyses may find that the value of an attribute in another step also impacts the process. The computing server 120 may also identify the reasons why certain steps in the process model 222 are not optimized or are delayed. The computing server 120 may also receive persisted audit trait 710 that can be treated as additional training samples to further refined the machine learning algorithm. The trained machine learning algorithm is persisted 680. The casual analyses 410 may be output 690 to action recommendation stage 700 and the query processing stage 750.

Example Action Recommendation Stage

Figure 7A:
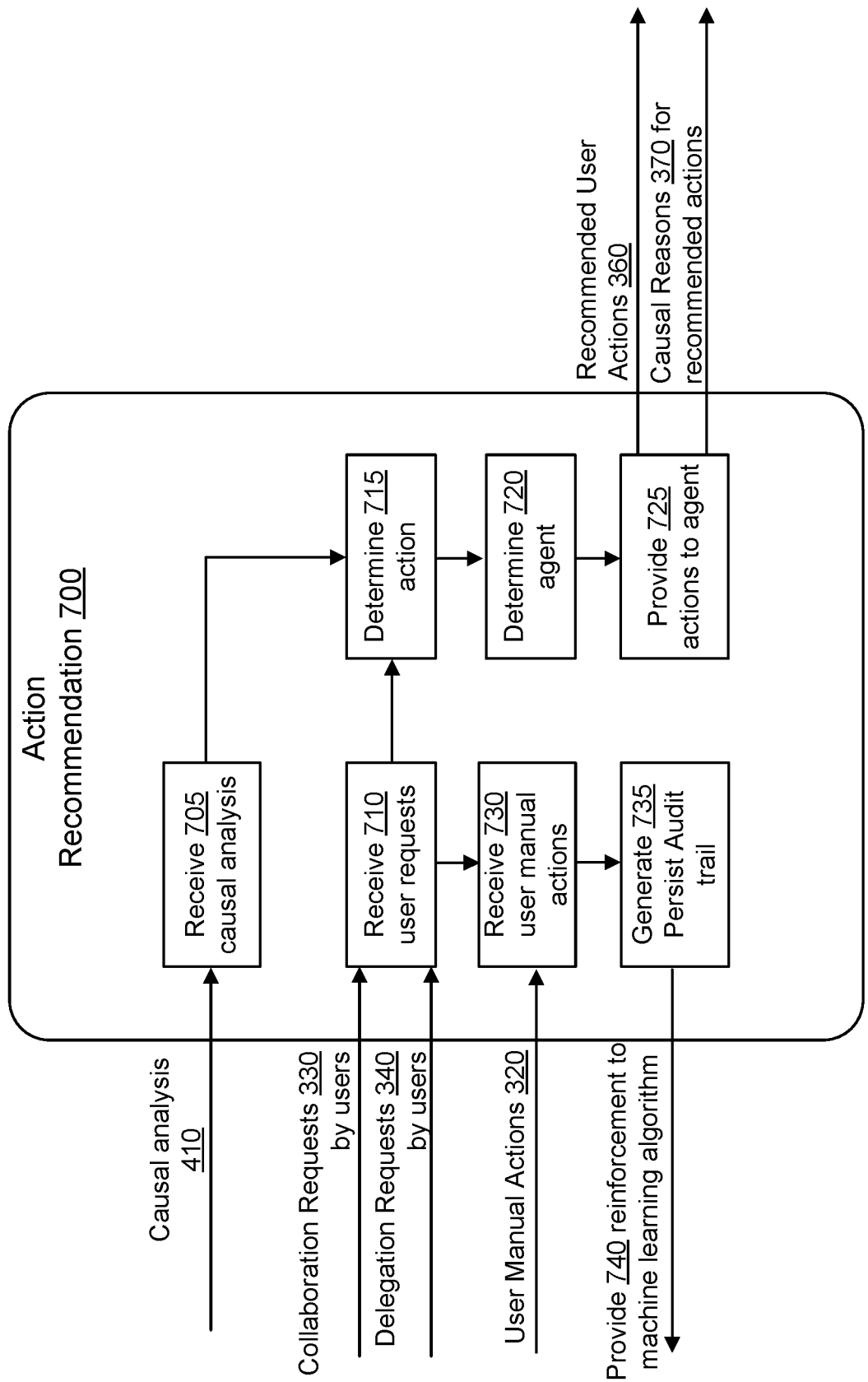
FIG. 7A is a block diagram illustrating an example action recommendation stage, in accordance with an embodiment.

FIG. 7A is a block diagram illustrating an example action recommendation stage 700, in accordance with an embodiment. In an action recommendation stage 700, the computing server 120 may generate a recommended action associated with one of the attributes that is identified as being statistically significant on impacting a process model 222 in order to improve the process model 222. The detail described in FIG. 7A is an example implementation of the action recommendation stage 700. In various embodiments, other variations of the action recommendation stage 700 may also be possible. Also, in various embodiments, one or more steps shown the flow shown in FIG. 7A may be skipped or changed. Other steps that are not shown in FIG. 7A may also be added. The action recommendation stage 700 may be carried out by various components of the computing server 120, such as the action recommendation engine 258.

The computing server 120 may receive 705 causal analysis 410. The causal analysis 410 may identify one or more steps or one or more attributes that are statistically significant on impacting the process model 222 or a step in the process model 222. The causal analysis 410 may also include correlation coefficients associated with the identified attributes. The correlation coefficients provide measurements of how the degree of correlation between an identified attribute and a performance indicator and whether the correlation is positive or negative.

The computing server 120 may receive 710 a user request to improve the process model. The request may be a collaboration request 330 or a delegation request 340. The user, through the request, may identify one or more steps that are associated with the collaboration request 330 or the delegation request 340. The computing server 120, based on the identified steps, may determine one or more attributes that are statistically significant on impacting the identified steps.

The computing server 120 may determine 715 an action associated with the step. The action identified by the computing server 120 may be provided to a user as a recommendation for the user to determine whether to take the action. Alternatively, or additionally, the action may also directly and automatically be routed to an agent to perform the action. The computing server 120 may determine 715 the recommended action based on attributes in the causal analysis 410 and also based on domain knowledge ontology. For example, the causal analysis 410 may identify that the workload of a manager (an example attribute) who usually approve a step has a strong positive correlation with the delay of the step. The manager may have submitted a delegation request 340. The computing server 120, based on the causal analysis 410 and domain knowledge ontology, may determine that a delegation is appropriate in this situation and recommend a delegation of the approval task to another employee.

The computing server 120 may determine 720 an agent to perform the recommended action. The identification of an agent may be based on a collaboration request 330, a delegation request 340, the domain knowledge ontology 226, and/or the causal analysis 410. For example, based on the domain knowledge ontology 226, the computing server 120 may determine that there are several potential agents that can perform the recommended action. The computing server 120 may rely on the collaboration request 330, the delegation request 340, or the causal analysis 410 to identify one of the agents that is best suited for the recommended action. For example, the computing server 120 may perform a causal analysis 410 to identify attributes of the agents that are most likely lead to an improvement to the process model 222.

The computing server 120 may provide 725 the recommended actions to the identified agent, which may be a user associated with the domain 110. The outputs may include recommended user actions 360 and causal reasons 370 for recommended actions. The causal reasons 370 may be derived from the attributes which have high correlation coefficients with a process model 222.

The computing server 120 may also receive data related to a user manual action 320 performed to improve the process model 222. For example, a user may manually approve or adjust the recommended actions 360. The computing server 120 may generate 735 the persist audit trail. The computing server 120 may provide the data to the machine learning algorithm in stage 600 that generates a recommended action to reinforce the training of the machine learning algorithm.

Example Query Processing Stage

Figure 7B:
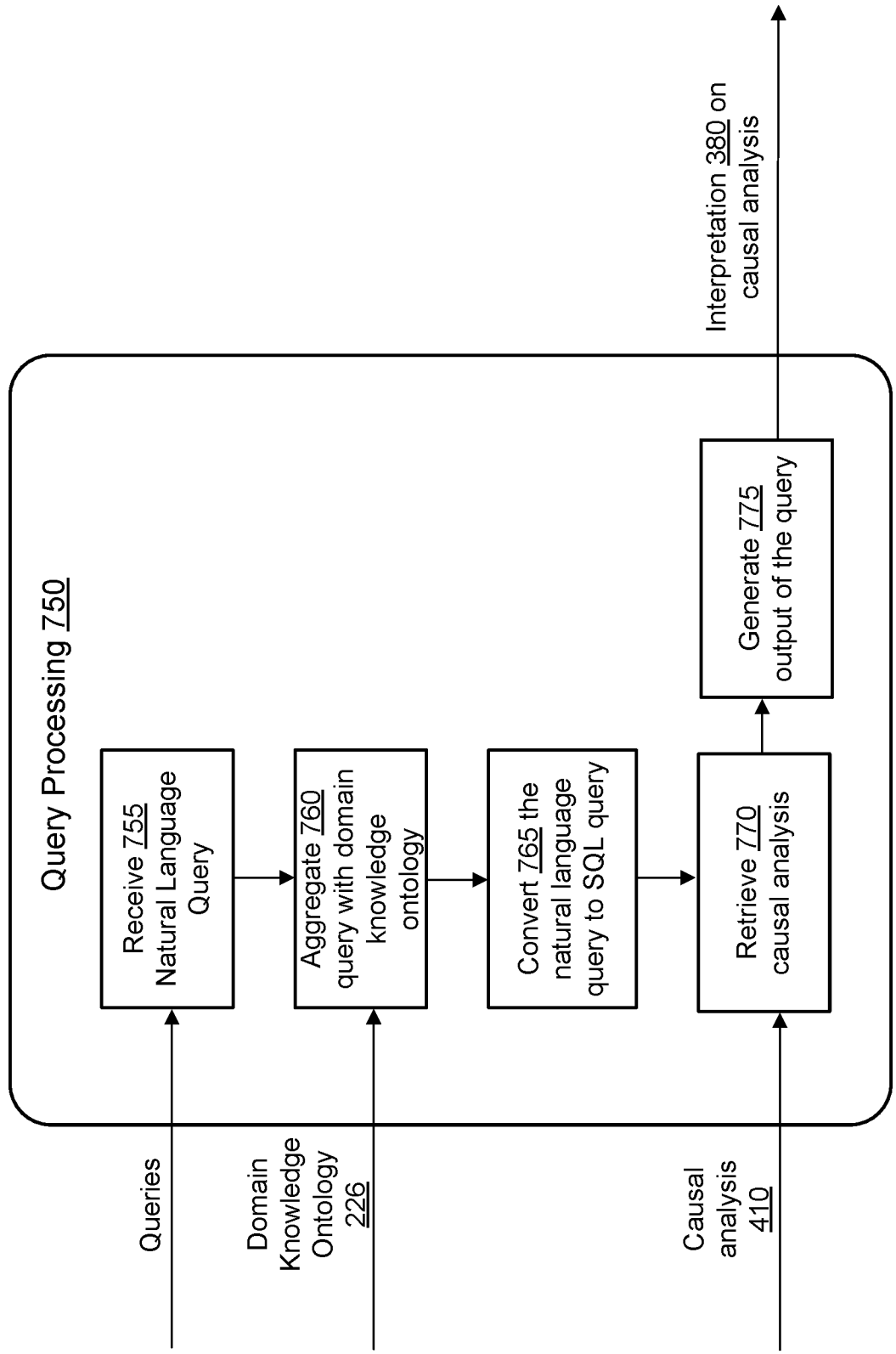
FIG. 7B is a block diagram illustrating an example query processing stage, in accordance with an embodiment.

FIG. 7B is a block diagram illustrating an example query processing stage 750, in accordance with an embodiment. In a query processing stage 750, the computing server 120 may return results to a search query related to a process model 222. The detail described in FIG. 7B is an example implementation of the query processing stage 750. In various embodiments, other variations of the query processing stage 750 may also be possible. Also, in various embodiments, one or more steps shown the flow shown in FIG. 7B may be skipped or changed. Other steps that are not shown in FIG. 7B may also be added. The query processing stage 750 may be carried out by various components of the computing server 120, such as the query engine 260.

The computing server 120 may receive 755 a query regarding a process model 222 from a user. The query may take the form of a natural language query or a structured query such as a SQL query. The query may inquire about various aspects of the process model 222, such as attributes associated with a particular step in the process model 222. The query may also be related to optimization of the process model, such as identifying a process bottleneck in a process model 222, identifying a causal reason why a particular step of a process model 222 is or is not optimized, determining attributes that have the most impact on the performance of a process model 222. The query may inquiry about the named entities, the transactions, and other resources related to the different process models 222. The query may also seek identification of potential issues in a process model 222, such as identifying a step that may have a compliance issue. The query may be entered through an input box of a graphical user interface, such as the interface 134 of a client device 130.

The computing server 120 may aggregate 760 the query with domain knowledge ontology 226. For example, a query may ask for information regarding a particular attribute. The attribute may be presented in one or more RDF entries in the domain knowledge ontology 226. The query may be translated from natural language query to a business query based on the business grammar and relationships defined in the domain knowledge ontology. For example, a query may be "who is the person in charge of step A?" Based on the domain knowledge ontology 226, the computing server 120 may identify the job titles and positions of the employees who can be in charge of step A. In another example, a query may be "what are the attributes that impact the performance of process B?" The computing server 120, based on the domain knowledge ontology 226, may identify candidate attributes that are relevant to process B.

The computing server 120 may convert the natural language query into a database query such as a structured query SQL using the domain knowledge ontology 226. For example, the natural language query can identify certain steps in a process. The domain knowledge ontology 226 defines various relationships that connect the steps to several attributes related to the process. Various instances of an attribute may be stored in a column in one or more structured data sources such as the master data 214 and the transaction data 218. Based on the domain knowledge ontology, the computing server 120 may identify rows and columns in a SQL database and convert the natural language query to a SQL query.

The computing server 120 may retrieve 770 causal analyses associated with a step that is related to the query. For example, the domain knowledge ontology 226 in step 765 may identify potentially relevant attributes that are related to a process model 222. Based on a database query generated, actual data of the attributes may be retrieved from various data sources. The data of the attributes may be aggregated as a consolidated fact table 510 in a pre-processing stage 500 and may be inputted to algorithm training and causal analysis stage 600 for the computing server 120 to generate causal analysis 410 regarding the attributes. The causal analysis 410 may identify one or more attributes that are statistically significant on impacting the performance of the process model 222 or a particular step in the process model 222. For example, a query may be "what is impacting the performance of a process C?" The causal analysis 410 may include the precise attribute or reasoning why process C is or is not optimized.

The computing server 120, based on the causal analysis 410, may generate 775 an output to the query based on the causal analysis 410. The output may be an interpretation 380 on the causal analysis. The output to the query may identify information of a step of the process model that can be used to improve the process model 222. For example, the computing server 120 may provide a recommended action 360 to a user. The query from the user may be "why do I need to do this action?" The computing server 120 may share a result with the user that the action assigned to the user could potentially improve 30% of the performance of the process model 222. The output to the query also may be data that are retrieved from databases. For example, a query in a natural language form may ask for data related to a particular event in a process model 222, such as "Give me data related to invoice generation of sales of item D." The computing server 120, based on the domain knowledge ontology 226 and the process model 222, may identify columns in transaction data 218 that are relevant to invoice generation and present an output that includes data to the user.

Example Graphical Representations of Process Models

FIG. 8 is an example graphical representation 800 of a process model 222, in accordance with an embodiment. The graphical representation 800 may be an example visual representation of a process map. The process map may be displayed (or provided for display) in the interface 134, such as a graphical user interface of an application provided by computing server 120 or a resource planning application 115. The underlying data (e.g., the process model 222) may be managed by a resource planning application 115 or computing server 120. The computing server 120, reading the data of a process model 222, may generate the graphical representation 800.

The graphical representation 800 may be a process map visualization that includes a series of events. For example, the graphical representation 800 may take the form of a directed graph that provides various steps in the process as nodes and connecting the nodes using edges. A step may correspond to an event "send request for quotation to supplier," "create quotation comparison map," or "analyze quotation comparison map," which is represented by a node. The domain 110 may include transaction data 218 that includes multiple instances of events that correspond to each step. For example, there can be many instances of "send request for quotation to supplier" over the course of business of the domain 110. The nodes in the graphical representation 800 may be connected with edges that may specify the average performance indicator value (e.g., average time) or estimated performance indicator value needed to transition from one step to another step. A process model 222 may also include multiple routes that are displayed in the graphical representation 800 as different branches from the starting point of the endpoint of the process model 222. The process model 222 may include multiple routes because the process model 222 may be generated from summarizing different instances of similar processes that have different variations, as previously illustrated in the discussion of the automatic process mining engine 254.

Through the GUI, the computing server 120 may receive various selections related to the process model 222 from a user as manual actions. For example, users can use the graphical representation 800 to input performance indicators, generate user manual actions 320, and make persisted audit trails 710. The graphical representation 800, which may be displayed in a GUI, may include multiple control elements for the user to perform actions and make a selection. For example, the edges and the nodes that represent various steps in a process model 222 may serve as control elements for the user to select. By selecting a node or an edge, a user may specify a performance indicator with respect to a specific step for the computing server 120 to optimize. For example, a user may select a node 810 that corresponds to the step "Amend Request for Quote." In response, the GUI may display a pop-up selection menu 820 for the user to select the performance indicator "Time," Volume," or "Revenue" for optimization associated with the node 810. The graphical representation 800 may also include a menu 830 for the user to select one or more performance indicators for the entire process model 222.

The selection by a user using the graphical representation 800 may also be a user manual action 320. After a user retrieves a process model 222 and selects to display it as the graphical representation 800, the user can perform various manual actions 320 to improve the process model 222. For example, the user may select an edge or a node. The GUI may display a pop-up selection menu 840 that allows the user to label the selected edge or node as a bottleneck of the process model 222 or to provide a command for automation to turn the steps associated with the selected edge or node as an automatic step. Other manual actions 320 may also be performed, such as adding a new edge to create an alternative route for certain steps, selecting one or more nodes to delete so that certain steps are eliminated, and changing the nature of a step (e.g., transforming the step).

Users, via clients devices, can also view an improved process model 340 generated by the process optimization engine 256 of the computing server 120 using the graphical representation 800. For example, the graphical representation 800 shown in FIG. 8 may be an improved process model 340. The graphical representation 800 may have different graphical elements, such as using different colors in the nodes, using dashed lines or different line styles for the edges, to represent the recommended optimization of a process model 222 that is generated by the process optimization engine 256. A user may manually review the optimization and select in the graphical representation whether to accept or reject the recommended changes. The acceptance or rejection may serve as reinforcement to further train the machine learning algorithm. The user may also make corrections to the recommended changes.

Example Machine Learning Algorithm

In various embodiments, a wide variety of machine learning techniques may be used. Examples of which include different forms of unsupervised learning, clustering, support vector regression (SVR) model, random forest classifiers, support vector machines (SVMs) such as kernel SVMs, gradient boosting, linear regression, logistic regression, and other forms of regressions. Deep learning techniques such as neural networks, including convolutional neural networks (CNN), recurrent neural networks (RNN), and long short-term memory networks (LSTM), may also be used. By way of example, in the process of algorithm training and causal analysis stage 600, various machine learning techniques may be used. In one embodiment, process optimization is performed using a neural network, whose example structure is shown in FIG. 9.

In various embodiments, the training techniques for a machine learning algorithm may be supervised, semi-supervised, or unsupervised. In supervised training, the machine learning algorithms may be trained with a set of training samples that are labeled. For example, for a machine learning algorithm that is about to be trained to identify a process that can be optimized, the training samples may include various transactions each labeled with whether the transaction is optimized. The labels for each training sample may be binary or multi-class. In training a machine learning algorithm for process optimization, the training samples may be transactions that are manually labeled. In some cases, an unsupervised learning technique may be used. The samples used in training are not labeled. Various unsupervised learning technique such as clustering may be used. In some cases, the training may be semi-supervised with training set having a mix of labeled samples and unlabeled samples.

A machine learning algorithm may be associated with an objective function, which generates a metric value that describes the objective goal of the training process. For example, the training may intend to reduce the error rate of the model in generating predictions. In such a case, the objective function may monitor the error rate of the machine learning algorithm. In process optimization, the objective function of the machine learning algorithm may be the training error rate in classifying whether a transaction is optimized in a training set. Such an objective function may be called a loss function. Other forms of objective functions may also be used, particularly for unsupervised learning models whose error rates are not easily determined due to the lack of labels. In various embodiments, the error rate may be measured as cross-entropy loss, L1 loss (e.g., the absolute distance between the predicted value and the actual value), L2 loss (e.g., root mean square distance).

Figure 9:
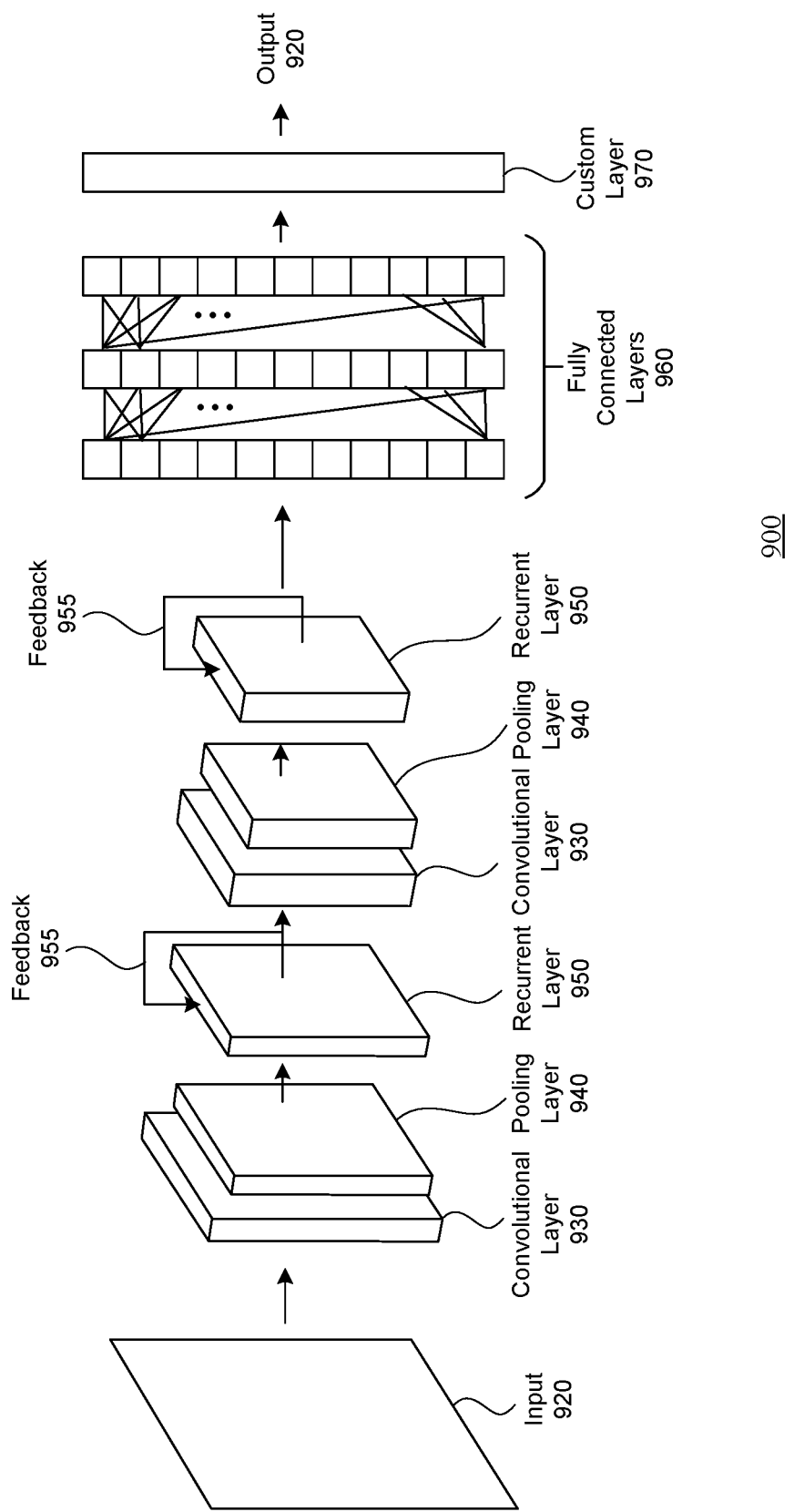
FIG. 9 is a block diagram illustrating the structure of an example machine learning algorithm, in accordance with an embodiment.

Referring to FIG. 9, a structure of an example CNN is illustrated, according to an embodiment. The CNN 900 may receive an input 910 and generate an output 920. The CNN 900 may include different kinds of layers, such as convolutional layers 930, pooling layers 940, recurrent layers 950, full connected layers 960, and custom layers 970. A convolutional layer 930 convolves the input of the layer with one or more kernels to generate convolved features. Each convolution result may be associated with an activation function. A convolutional layer 930 may be followed by a pooling layer 940 that selects the maximum value (max pooling) or average value (average pooling) from the portion of the input covered by the kernel size. The pooling layer 940 reduces the spatial size of the extracted features. In some embodiments, a pair of convolutional layer 930 and pooling layer 940 may be followed by a recurrent layer 950 that includes one or more feedback loop 955. The recurrent layer 950 may be gated in the case of an LSTM. The feedback 955 may be used to account for temporal relationships of the transactions in a process model 222. The layers 930, 940, and 950 may be followed in multiple fully connected layers 960 that have nodes (represented by squares in FIG. 9) connected to each other. The fully connected layers 960 may be used for classification and object identification. In one embodiment, one or more custom layers 970 may also be presented for the generation of a specific format of output 920.

The order of layers and the number of layers of the CNN 900 in FIG. 9 is for example only. In various embodiments, a CNN 900 includes one or more convolutional layer 930 but may or may not include any pooling layer 940 or recurrent layer 950. If a pooling layer 940 is present, not all convolutional layers 930 are always followed by a pooling layer 940. A recurrent layer may also be positioned differently at other locations of the CNN. For each convolutional layer 930, the sizes of kernels (e.g., 3×3, 5×5, 7×7, etc.) and the numbers of kernels allowed to be learned may be different from other convolutional layers 930.

A machine learning algorithm may include certain layers, nodes, kernels, and/or coefficients. Training of a neural network, such as the CNN 900, may include forward propagation and backpropagation. Each layer in a neural network may include one or more nodes, which may be fully or partially connected to other nodes in adjacent layers. In forward propagation, the neural network performs the computation in the forward direction based on outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

Each of the functions in the neural network may be associated with different coefficients (e.g. weights and kernel coefficients) that are adjustable during training. In addition, some of the nodes in a neural network each may also be associated with an activation function that decides the weight of the output of the node in forward propagation. Common activation functions may include step functions, linear functions, sigmoid functions, hyperbolic tangent functions (tan h), and rectified linear unit functions (ReLU). After an input is provided into the neural network and passes through a neural network in the forward direction, the results may be compared to the training labels or other values in the training set to determine the neural network's performance. The process of prediction may be repeated for other transactions in the training sets to compute the value of the objective function in a particular training round. In turn, the neural network performs backpropagation by using coordinate descent such as stochastic coordinate descent (SCD) to adjust the coefficients in various functions to improve the value of the objective function.

Multiple rounds of forward propagation and backpropagation may be performed. Training may be completed when the objective function has become sufficiently stable (e.g., the machine learning algorithm has converged) or after a predetermined number of rounds for a particular set of training samples. The trained machine learning algorithm can be used for performing process optimization or another suitable task for which the model is trained.

Computing Machine Architecture

FIG. 10 is a block diagram illustrating components of an example computing machine that is capable of reading instructions from a computer-readable medium and execute them in a processor (or controller). A computer described herein may include a single computing machine shown in FIG. 10, a virtual machine, a distributed computing system that includes multiples nodes of computing machines shown in FIG. 10, or any other suitable arrangement of computing devices.

By way of example, FIG. 10 shows a diagrammatic representation of a computing machine in the example form of a computer system 1000 within which instructions 1024 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 10 may correspond to any software, hardware, or combined components shown in FIGS. 1 and 2, including but not limited to, the domain 100, the computing server 120, the client device 130 and various engines, interfaces, terminals, and machines shown in FIG. 2. While FIG. 10 shows various hardware and software elements, each of the components described in FIG. 1 or FIG. 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1024 that specify actions to be taken by that machine. Further, while only a single machine is illustrated, the term "machine" and "computer" may also be taken to include any collection of machines that individually or jointly execute instructions 1024 to perform any one or more of the methodologies discussed herein.

The example computer system 1000 includes one or more processors 1002 such as a CPU (central processing unit), a GPU (graphics processing unit), a TPU (tensor processing unit), a DSP (digital signal processor), a system on a chip (SOC), a controller, a state machine, an application-specific integrated circuit (ASIC), a field-programmable gate array (FPGA), or any combination of these. Parts of the computing system 1000 may also include a memory 1004 that store computer code including instructions 1024 that may cause the processors 1002 to perform certain actions when the instructions are executed, directly or indirectly by the processors 1002. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 1002 and reduces the space required for the memory 1004. For example, the machine learning methods described herein reduces the complexity of the computation of the processors 1002 by applying one or more novel techniques that simplify the steps in training, reaching convergence, and generating results of the processors 1002. The algorithms described herein also reduces the size of the models and datasets to reduce the storage space requirement for memory 1004.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The computer system 1000 may include a main memory 1004, and a static memory 1006, which are configured to communicate with each other via a bus 1008. The computer system 1000 may further include a graphics display unit 1010 (e.g., a plasma display panel (PDP), a liquid crystal display (LCD), a projector, or a cathode ray tube (CRT)). The graphics display unit 1010, controlled by the processors 1002, displays a graphical user interface (GUI) to display one or more results and data generated by the processes described herein. The computer system 1000 may also include an alphanumeric input device 1012 (e.g., a keyboard), a cursor control device 1014 (e.g., a mouse, a trackball, a joystick, a motion sensor, or another pointing instrument), a storage unit 1016 (a hard drive, a solid state drive, a hybrid drive, a memory disk, etc.), a signal generation device 1018 (e.g., a speaker), and a network interface device 1020, which also are configured to communicate via the bus 1008.

The storage unit 1016 includes a computer-readable medium 1022 on which is stored instructions 1024 embodying any one or more of the methodologies or functions described herein. The instructions 1024 may also reside, completely or at least partially, within the main memory 1004 or within the processor 1002 (e.g., within a processor's cache memory) during execution thereof by the computer system 1000, the main memory 1004 and the processor 1002 also constituting computer-readable media. The instructions 1024 may be transmitted or received over a network 1026 via the network interface device 1020.

While computer-readable medium 1022 is shown in an example embodiment to be a single medium, the term "computer-readable medium" should be taken to include a single medium or multiple media (e.g., a centralized or distributed database, or associated caches and servers) able to store instructions (e.g., instructions 1024). The computer-readable medium may include any medium that is capable of storing instructions (e.g., instructions 1024) for execution by the processors (e.g., processors 1002) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

ADDITIONAL CONSIDERATIONS

Beneficially, a computing server that automatically optimizes process model of a domain reduces the computing time of the domain in identifying a process and classifying data as relevant to a process model. The computing server achieves efficient and effective data and process management of the domain by extracting facts that are relevant to a process model and aggregating the facts from various data sources based on the domain knowledge ontology of the domain. This allows processes that are conventionally challenging to discover to be automatically and systematically identified and optimized. The causal analysis and query platform generated by a computing server also provide users with intuitive and user friendly information on the decision making and reasoning in the process optimization and allow users to better interact with the process optimization platform such as by inputting delegation and collaboration requests.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments according to the invention are in particular disclosed in the attached claims directed to a method and a computer program product, wherein any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method, comprising:
    receiving master data, transaction data, and a process model of a domain;
    aggregating, based on domain knowledge ontology of the domain, the master data and the transaction data to generate a fact table;
    converting entries in the fact table into vectors;
    identifying, based on the vectors, an attribute that impacts the process model, wherein identifying, based on the vectors, the attribute that impacts the process model comprises:
        receiving a performance indicator,
        inputting the vectors into an algorithm to identify a correlation between the attribute and the performance indicator,
        determining a p-value of the attribute, and
        determining, based on the p-value, whether the attribute is statistically significant on impacting the performance indicator;
    generating an action associated with the attribute to improve the process model; and
    providing the action to a client device associated with the domain.

2. The computer-implemented method of claim 1, wherein the algorithm is a regression algorithm.

3. The computer-implemented method of claim 1, wherein generating the action associated with the attribute to improve the process model comprises:
    receiving a request to improve the process model,
    determining the action based on the request and the attribute, and
    identifying an agent to perform the action, the agent being a user associated with the client device provided with the action.

4. The computer-implemented method of claim 3, wherein the request is a collaboration request or a delegation request.

5. The computer-implemented method of claim 3, further comprising:
    receiving data related to a user manual action performed to improve the process model;
    providing the data to a machine learning algorithm that generates the action to reinforce the machine learning algorithm.

6. The computer-implemented method of claim 1, further comprising:
    receiving a query regarding the process model;
    aggregating the query with domain knowledge ontology;
    retrieving causal analyses associated with the attribute; and
    generating an output to the query based on the causal analyses.

7. The computer-implemented method of claim 6, wherein the query is a natural language query, and aggregating the query with domain knowledge ontology comprises converting the natural language query into a database query using the domain knowledge ontology.

8. The computer-implemented method of claim 6, wherein the output to the query identifies information of the step of the process model that can be used to improve the process model.

9. The computer-implemented method of claim 1, wherein aggregating, based on the domain knowledge ontology of the domain, the master data and the transaction data to generate the fact table comprises:
    deriving relationships of entities in the master data and the transaction data based on the domain knowledge ontology of the domain;
    converting the relationships of the entities into serialization entries in the fact table.

10. The computer-implemented method of claim 9, wherein the serialization entries are in a resource description framework format.

11. The computer-implemented method of claim 1, wherein the master data and the transaction data are received from an enterprise resource planning application of the domain, and the improved process model is fed back to the enterprise resource planning application.

12. The computer-implemented method of claim 1, the performance indicator is at least one of time, revenue, cost, profit, or compliance.

13. The computer-implemented method of claim 1, wherein the entries in the fact table are scaled by feature scaling prior to converting into the vectors.

14. A system comprising:
    one or more processors; and
    memory configured to store computer code comprising instructions, the instructions, when executed by the one or more processors, cause the one or more processor to:
        receive master data, transaction data, and a process model of a domain;

aggregate, based on domain knowledge ontology of the domain, the master data and the transaction data to generate a fact table;

convert entries in the fact table into vectors;

identify, based on the vectors, an attribute that impacts the process model wherein the instructions to identify, based on the vectors, the attribute that impacts the process model comprises the instructions to:

receive a performance indicator, input the vectors into an algorithm to identify a correlation between the attribute and the performance indicator, determine a p-value of the attribute, and determine, based on the p-value, whether the attribute is statistically significant on impacting the performance indicator;

generate an action associated with the attribute to improve the process model; and providing the action to a client device associated with the domain.

15. The system of claim 14, wherein the instruction to generate the action associated with the step to improve the process model comprises instructions to:

receive a request to improve the process model, determine the action based on the request and the attribute, and identify an agent to perform the action, the agent being a user associated with the client device provided with the action.

16. The system of claim 14, wherein the instructions, when executed, further cause the one or more processors to:

receive a query regarding the process model;

aggregate the query with domain knowledge ontology;

retrieve the action associated with the step that is related to the query; and generate an output to the query based on the action.

17. A non-transitory computer readable medium for storing computer code comprising instructions, the instructions, when executed by one or more processors, cause the one or more processors to:

receive master data, transaction data, and a process model of a domain;

aggregate, based on domain knowledge ontology of the domain, the master data and the transaction data to generate a fact table;

convert entries in the fact table into vectors;

identify, based on the vectors, an attribute that impacts the process model, wherein the instructions to identify, based on the vectors, the attribute that impacts the process model comprises the instructions to:

receive a performance indicator, input the vectors into an algorithm to identify a correlation between the attribute and the performance indicator, determine a p-value of the attribute, and determine, based on the p-value, whether the attribute is statistically significant on impacting the performance indicator;

generate an action associated with the attribute to improve the process model; and providing the action to a client device associated with the domain.

18. The non-transitory computer readable medium of claim 17, wherein the instruction to generate the action associated with the step to improve the process model comprises instructions to:

receive a request to improve the process model, determine an action based on the request and the attribute, and identify an agent to perform the action, the agent being a user associated with the client device provided with the action.

19. The non-transitory computer readable medium of claim 17, wherein the instructions, when executed, further cause the one or more processors to:

receive a query regarding the process model;

aggregate the query with domain knowledge ontology;

retrieve causal analyses associated with the attribute; and generate an output to the query based on the causal analyses.

\* \* \* \* \*